(12) United States Patent
Yamamoto et al.

(10) Patent No.: US 10,761,491 B2
(45) Date of Patent: Sep. 1, 2020

(54) PORTABLE ELECTRONIC DEVICE

(71) Applicant: SEIKO EPSON CORPORATION, Tokyo (JP)

(72) Inventors: Hironobu Yamamoto, Shiojiri (JP); Tadashi Aizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 151 days.

(21) Appl. No.: 15/895,442

(22) Filed: Feb. 13, 2018

(65) Prior Publication Data
US 2018/0239308 A1   Aug. 23, 2018

(30) Foreign Application Priority Data

Feb. 20, 2017 (JP) ................................ 2017-028749
Sep. 6, 2017 (JP) ................................ 2017-170929

(51) Int. Cl.
| | | |
|---|---|---|
| G04R 60/10 | (2013.01) | |
| G04G 17/06 | (2006.01) | |
| G04R 20/02 | (2013.01) | |
| G04G 17/08 | (2006.01) | |
| G04G 19/00 | (2006.01) | |
| G04G 17/04 | (2006.01) | |

(52) U.S. Cl.
CPC ............. *G04R 60/10* (2013.01); *G04G 17/04* (2013.01); *G04G 17/06* (2013.01); *G04G 17/08* (2013.01); *G04G 19/00* (2013.01); *G04R 20/02* (2013.01)

(58) Field of Classification Search
CPC ........ G04R 60/00; G04R 60/02; G04R 60/06; G04R 60/10; G04R 60/12; H01Q 1/273
See application file for complete search history.

(56) References Cited

U.S. PATENT DOCUMENTS

| | | | | |
|---|---|---|---|---|
| 5,007,105 | A * | 4/1991 | Kudoh | G08B 5/228 340/407.1 |
| 5,926,144 | A * | 7/1999 | Bolanos | G04B 47/025 343/718 |
| 6,278,873 | B1 * | 8/2001 | Itakura | G04G 17/02 455/347 |
| 6,281,854 | B1 * | 8/2001 | Ohoka | H01Q 1/273 343/718 |
| 6,992,952 | B2 * | 1/2006 | Endo | G04G 21/04 368/10 |
| 10,424,833 | B2 * | 9/2019 | Aizawa | G04G 21/04 |

(Continued)

FOREIGN PATENT DOCUMENTS

| | | |
|---|---|---|
| JP | H10-197662 A | 7/1998 |
| JP | 2004-312166 A | 11/2004 |

(Continued)

*Primary Examiner* — Daniel P Wicklund
(74) *Attorney, Agent, or Firm* — Oliff PLC

(57) ABSTRACT

An electronic timepiece which is a portable electronic device includes a planar first conductor element including a feed element which is a feed portion, a planar second conductor element which is disposed so as to overlap the first conductor element in plan view and includes a ground portion, a short circuit portion that connects the first conductor element and the second conductor element, and a non-conductive base plate that is disposed between the first conductor element and the second conductor element and to which a step motor which is a driving element is attached.

30 Claims, 14 Drawing Sheets

(56) References Cited

U.S. PATENT DOCUMENTS

| | | | |
|---|---|---|---|
| 2004/0196195 A1 | 10/2004 | Yuanzhu | |
| 2004/0252064 A1 | 12/2004 | Yuanzhu | |
| 2007/0097795 A1* | 5/2007 | Hosobuchi | G04B 19/247 368/37 |
| 2014/0197994 A1* | 7/2014 | Hossain | H01Q 1/273 343/700 MS |
| 2014/0266935 A1* | 9/2014 | Tankiewicz | H01Q 7/00 343/720 |
| 2014/0354494 A1* | 12/2014 | Katz | H01Q 1/273 343/718 |
| 2015/0029060 A1* | 1/2015 | Jeon | H01Q 1/24 343/702 |
| 2016/0049721 A1* | 2/2016 | Aizawa | H01Q 1/273 343/718 |
| 2017/0184724 A1* | 6/2017 | Aizawa | G01S 19/14 |
| 2019/0058256 A1* | 2/2019 | Sepanniitty | H01Q 7/00 |
| 2019/0302703 A1* | 10/2019 | Luk | G04R 60/12 |
| 2019/0312345 A1* | 10/2019 | Kim | G04R 60/12 |

FOREIGN PATENT DOCUMENTS

| | | |
|---|---|---|
| JP | 2005-05866 A | 1/2005 |
| JP | 2012-093211 A | 5/2012 |
| JP | 2012-198176 A | 10/2012 |
| JP | 2017-118377 A | 6/2017 |

\* cited by examiner

PORTABLE ELECTRONIC DEVICE

This application claims the benefit of Japanese Application No. JP 2017-028749 filed Feb. 20, 2017, and Japanese Application No. JP 2017-170929 filed Sep. 6, 2017. The disclosure of the prior applications is hereby incorporated by reference herein in their entirety.

BACKGROUND

1. Technical Field

The present invention relates to, for example, a portable electronic device with a satellite positioning function such as GPS.

2. Related Art

In a case where a global positioning system (GPS) receiver is incorporated in a casing of a compact portable electronic device such as a wristwatch, it is necessary to minimize the volume of the antenna used for the receiver as small as possible.

For example, JP-A-10-197662 describes a portable electronic device in which a patch antenna capable of receiving GPS radio waves from a GPS satellite (positioning satellite) is mounted so as to overlap a movement. The patch antenna used herein can receive GPS radio waves by using a dielectric having a large relative permittivity, by utilizing a wavelength shortening effect of a dielectric. However, since the patch antenna described in JP-A-10-197662 uses a dielectric having a large relative permittivity so as to be able to receive GPS radio waves, there is a limit in miniaturization, and there is a problem that the arrangement occupation ratio in the case of the portable electronic device is increased or the cost of the dielectric used for utilizing the wavelength shortening effect is increased.

Incidentally, JP-A-2004-312166 describes a planar inverted F antenna capable of receiving GPS radio waves from GPS satellites. In the planar inverted F antenna, a planar radiating conductor plate is disposed on a planar ground conductor surface, and the radiating conductor plate and the ground conductor surface are connected by a feeding conductor plate (feed portion) and a short-circuit conductor plate (short circuit portion).

Further, JP-A-2005-005866 describes a planar inverted F antenna in which a planar radiation conductor portion is disposed so as to cover a circuit substrate on which a grounding pattern (GND layer) is stacked, and a feed conductor portion and a short-circuit conductor portion derived from the radiation conductor portion are connected to the circuit substrate. Here, it is assumed that it is possible to dispose parts on the circuit substrate.

However, in the planar inverted-F antenna described in JP-A-2004-312166 and JP-A-2005-5866, the equivalent electrical length of one side can be shortened to the size of λ/4 (5 cm) of the wavelength λ (=20 cm) of the GPS radio wave obtained by Calculation Example 1 as shown below as compared with the patch antenna, but this length of antenna may not fit within the case of the portable electronic device (for example, a watch), depending on the size of a timepiece in some cases.

$$c(\text{speed of light}) = \text{Freq}(\text{GPS frequency}) \times \lambda c = 0.3 \times 10^9 \text{ (km/sec)}, \text{Freq} = 1.57542 \times 10^9 \text{ (Hz)} \lambda = c/\text{Freq} = (0.3 \times 10^9)/(1.57542 \times 10^9) = 20 \text{ (cm)} \quad \text{Calculation Example 1}$$

SUMMARY

An advantage of some aspects of the invention is to solve at least a part of the problems described above, and the invention can be implemented as the following forms or application examples.

Application Example 1

A portable electronic device according to this application example includes a planar first conductor element connected to a feed portion; a planar second conductor element which is disposed so as to overlap the first conductor element in plan view and includes a ground portion; a short circuit portion that connects the first conductor element and the second conductor element; and a non-conductive base plate that is disposed between the first conductor element and the second conductor element and to which a driving element is attached.

According to the portable electronic device described in this application example, the non-conductive base plate is regarded as a dielectric and a wavelength shortening effect by the base plate is utilized, such that a planar inverted-F antenna configured with the planar first conductor element connected to a feed portion, the planar second conductor element including a ground portion, and the short circuit portion that connects the first conductor element and the second conductor element can be miniaturized. This makes it possible to accommodate the planar inverted-F antenna in the case of a small portable electronic device (for example, watch). Then, by accommodating the planar inverted-F antenna of this configuration in the case, it is possible to realize a small portable electronic device.

Application Example 2

It is preferable that the portable electronic device according to the application example further includes a circuit substrate including at least a circuit that controls the driving element.

According to this application example, the driving element can be controlled by including a circuit substrate including at least a circuit (control circuit) that controls the driving element.

Application Example 3

In the portable electronic device according to the application example, it is preferable that the base plate and the circuit substrate are disposed between the first conductor element and the second conductor element.

According to this application example, as compared with a structure in which an antenna is disposed so as to overlap a movement as in JP-A-10-197662, the arrangement efficiency can be enhanced by disposing the base plate and the circuit substrate in the space between the first conductor element and the second conductor element, which can make a portable electronic device having a reduced thickness.

Application Example 4

It is preferable that the portable electronic device according to the application example further includes a first anti-magnetic plate; and a second anti-magnetic plate, and the base plate and the circuit substrate are preferably disposed between the first anti-magnetic plate and the second anti-magnetic plate.

According to this application example, it is possible to reduce the influence of the magnetic field received from the outside on the base plate and the circuit substrate disposed between the first anti-magnetic plate and the second anti-magnetic plate.

Application Example 5

In the portable electronic device according to the application example, it is preferable that the first anti-magnetic plate, the base plate, the circuit substrate, and the second anti-magnetic plate are disposed between the first conductor element and the second conductor element.

According to this application example, the arrangement efficiency can be enhanced by disposing the first anti-magnetic plate, the base plate, the circuit substrate, and the second anti-magnetic plate between the first conductor element and the second conductor element, as compared with the case where the first anti-magnetic plate, the base plate, the circuit substrate, or the like are disposed separately from the antenna including the first conductor element and the second conductor element, which can make a portable electronic device having a reduced thickness.

Application Example 6

In the portable electronic device according to the application example, it is preferable that the second conductor element is disposed between the base plate and the circuit substrate.

According to this application example, arrangement can be varied in many ways by disposing the second conductor element between the base plate and the circuit substrate.

Application Example 7

In the portable electronic device according to the application example, it is preferable that the first conductor element, the base plate, the second conductor element, and the circuit substrate are disposed between the first anti-magnetic plate and the second anti-magnetic plate.

According to this application example, a portable electronic device having a reduced current loss caused by flow of current to the anti-magnetic plate can be made, by disposing the first conductor element, the base plate, the second conductor element, and the circuit substrate between the first anti-magnetic plate and the second anti-magnetic plate.

Application Example 8

In the portable electronic device according to the application example, it is preferable that the driving element includes a motor and a gear.

According to this application example, since the driving element includes the motor and the gear, a clocking operation can be easily performed.

Application Example 9

A portable electronic device according to this application example includes a planar first conductor element connected to a feed portion; a planar second conductor element which is disposed so as to overlap the first conductor element in plan view and includes a ground portion; a short circuit portion that connects the first conductor element and the second conductor element; a non-conductive date wheel and a non-conductive date wheel presser that are disposed between the first conductor element and the second conductor element; and a movement that is disposed on a side opposite to a side of the first conductor element of the second conductor element so as to overlap the second conductor element.

According to the portable electronic device described in this application example, the non-conductive date wheel and the date wheel presser are regarded as a dielectric and a wavelength shortening effect by the date wheel and the date wheel presser is utilized, such that a planar inverted-F antenna configured with the planar first conductor element connected to a feed portion, the planar second conductor element including a ground portion, and the short circuit portion that connects the first conductor element and the second conductor element can be miniaturized. Further, since the movement is disposed so as to overlap the second conductor element on the side opposite to the first conductor element side of the second conductor element, the arrangement efficiency can be enhanced. This makes it possible to accommodate the planar inverted-F antenna and the movement in the case of a small portable electronic device (for example, watch). Then, by accommodating the planar inverted-F antenna and the movement of this configuration in the case, it is possible to realize a small portable electronic device.

Application Example 10

It is preferable that the portable electronic device according to the application example further includes a circuit substrate, and the movement is disposed between the second conductor element and the circuit substrate.

According to this application example, the arrangement efficiency can be enhanced by disposing the movement between the second conductor element and the circuit substrate.

Application Example 11

In the portable electronic device according to the application example, it is preferable that the feed portion of the first conductor element is connected to a feed terminal of the circuit substrate, and the ground portion of the second conductor element is connected to a ground terminal of the circuit substrate.

According to this application example, with such a configuration, it is possible to configure the planar inverted-F antenna.

Application Example 12

In the portable electronic device according to the application example, it is preferable that the first conductor element and the second conductor element are made of metal or includes a metallic coating.

According to this application example, it is possible to configure the first conductor element and the second conductor element of which thickness can be reduced and molding is easy.

Application Example 13

In the portable electronic device according to the application example, it is preferable that the first conductor element, the second conductor element, and the short circuit portion are formed as an integral structure.

According to this application example, the first conductor element, the second conductor element, and the short circuit portion can be formed more efficiently.

Application Example 14

In the portable electronic device according to the application example, it is preferable that the short circuit portion includes a curved portion.

According to this application example, the curved portion can function as a buffering portion for buffering the impact received from the outside.

Application Example 15

In the portable electronic device according to the application example, it is preferable that the short circuit portion includes a plurality of connection portions.

According to this application example, since a plurality of short circuit portions is provided, the contact resistance of the short circuit portion can be reduced, and the resistance of the planar inverted-F antenna is reduced to cause more current to be able to flow widely by the planar inverted-F antenna itself, it is possible to reduce the loss of the planar inverted-F antenna itself.

Application Example 16

In the portable electronic device according to the application example, it is preferable that a plurality of the short circuit portions is disposed, and an angle θ between a first imaginary line connecting the short circuit portion located at one end and a center of the first conductor element, and a second imaginary line connecting the short circuit portion located at the other end and the center of the first conductor element satisfies 0 degrees<θ≤90 degrees.

According to this application example, since a plurality of the short circuit portions is provided, the contact resistance of the short circuit portion can be reduced, and the resistance of the planar inverted-F antenna is reduced to cause more current to be able to flow widely by the planar inverted-F antenna itself, it is possible to reduce the loss of the planar inverted-F antenna itself. Further, when a degree between a first imaginary line connecting the short circuit portion located at one end and a center of the first conductor element, and a second imaginary line connecting the short circuit portion located at the other end and the center of the first conductor element is an angle θ, by disposing the short circuit portion located at one end and the short circuit portion located at the other end at a location satisfying 0 degrees<θ≤90 degrees, it is possible to increase the resonance frequency of the planar inverted-F antenna to resonate at the frequency of the satellite radio wave to be received.

Application Example 17

In the portable electronic device according to the application example, it is preferable that a plurality of the short circuit portions is disposed, and an angle θ between a first imaginary line connecting the short circuit portion located at one end and a center of the first conductor element, and a second imaginary line connecting the short circuit portion located at the other end and the center of the first conductor element satisfies 0 degrees<θ≤170 degrees.

According to this application example, since a plurality of the short circuit portions is provided, the contact resistance of the short circuit portion can be reduced, and the resistance of the planar inverted-F antenna is reduced to cause more current to be able to flow widely by the planar inverted-F antenna itself, it is possible to reduce the loss of the planar inverted-F antenna itself. Further, when a degree between a first imaginary line connecting the short circuit portion located at one end and a center of the first conductor element, and a second imaginary line connecting the short circuit portion located at the other end and the center of the first conductor element is an angle θ, by disposing the short circuit portion located at one end and the short circuit portion located at the other end at a location satisfying 0 degrees<θ≤170 degrees, it is possible to increase the resonance frequency of the planar inverted-F antenna to resonate at the frequency of the satellite radio wave to be received.

Application Example 18

It is preferable that the portable electronic device according to the application example further includes a dial plate that is disposed on a side opposite to a side of the second conductor element of the first conductor element so as to overlap the first conductor element; and a solar panel that is disposed between the dial plate and the first conductor element and receives light incident from the side of the dial plate to generate power.

According to this application example, on the side opposite to the second conductor element side of the first conductor element, a dial plate disposed so as to overlap the first conductor element, and a solar panel which is disposed between the dial plate and first conductor element and receives light incident from the side of the dial plate to generate power can be configured with high efficiency.

Further, by setting the size of the first conductor element to be equal to or larger than the size of the solar panel, radio waves can be received without being affected by the solar panel. In addition, by sharing the metal surface of the solar panel as the first conductor element, it can be miniaturized as compared with the case where the metal surface is not shared.

Application Example 19

It is preferable that the portable electronic device according to the application example further includes a case made of metal, and it is preferable that a distance between the outer edge of the first conductor element accommodated inside the case and the inner wall of the case is 1 mm or more in plan view.

According to this application example, by setting the distance between the outer edge of the first conductor element accommodated inside the case and the inner wall of the case to 1 mm or more in plan view, it is possible to reliably receive GPS radio waves at the outer edge of the first conductor element even in the case of the metal case. By using the metal case, the radiation efficiency can be enhanced (for example, 74%), and the reception performance of the planar inverted-F antenna can be improved.

Application Example 20

In the portable electronic device according to the application example, it is preferable that the first conductor element is a first anti-magnetic plate.

Application Example 21

In the portable electronic device according to the application example, it is preferable that the second conductor element is a second anti-magnetic plate.

Application Example 22

In the portable electronic device according to the application example, it is preferable that the base plate and the circuit substrate are disposed between the first anti-magnetic plate and the second conductor element.

Application Example 23

In the portable electronic device according to the application example, it is preferable that the second anti-magnetic plate is disposed between the base plate and the circuit substrate.

By using the configurations of Application Example 20 to Application Example 23, it is possible to realize thinner internal structures, each of which includes a planar inverted-F antenna.

Application Example 24

It is preferable that the portable electronic device according to the application example further includes a solar panel supported by a supporting portion, and the supporting portion also serves as the first conductor element.

According to this application example, since the supporting portion of the solar panel is shared as the first conductor element, the internal structure can be miniaturized as compared with the case where the supporting portion is not shared.

Application Example 25

In the portable electronic device according to the application example, it is preferable that at least a part of the first conductor element is located outside the outer edge of the solar panel in plan view.

According to this application example, by setting the size of the first conductor element to be equal to or larger than the size of the solar panel, radio waves can be received without being affected by the solar panel. In addition, by sharing the metal surface of the solar panel as the first conductor element, it can be miniaturized as compared with the case where the metal surface is not shared.

Application Example 26

In the portable electronic device according to the application example, it is preferable that a through hole is formed in the first conductor element, and a rotation shaft is disposed in the through hole.

According to this application example, a rotation shaft is disposed in the through hole formed in the first conductor element, such that analog display using indication needles can be performed.

Application Example 27

In the portable electronic device according to the application example, it is preferable that the power generated by the solar panel is input to the circuit substrate by a conduction portion disposed along the short circuit portion.

According to this application example, the conduction portion is disposed along the short circuit portion, such that the influence of the solar panel on the antenna can be reduced.

Application Example 28

In the portable electronic device according to the application example, it is preferable that the conduction portion includes a coil.

According to this application example, high frequency components in the solar panel can be cut off and the influence of the solar panel on the antenna can be reduced, by the coil included in the conduction portion disposed along the short circuit portion.

Application Example 29

In the portable electronic device according to the application example, it is preferable that the coil has one end connected to the solar panel, and the other end connected to the circuit substrate.

According to this application example, high frequency components in the solar panel can be cut off and the influence of the solar panel on the antenna can be reduced, by the coil having one end connected to the solar panel, and the other end connected to the circuit substrate.

Application Example 30

It is preferable that the portable electronic device according to the application example further includes a non-conductive spacer that is disposed between the first conductor element and the second conductor element, and it is preferable that the spacer is configured such that a side facing the first conductor element and a side facing the second conductor element are substantially parallel.

According to this application example, the first conductor element and the second conductor element can be supported substantially in parallel by the non-conductive spacer disposed between the first conductor element and the second conductor element. This makes it possible to prevent a reduction in the sensitivity of the antenna and the variation of the resonance frequency due to the fact that the parallelism between the first conductor element and the second conductor element cannot be maintained.

Application Example 31

In the portable electronic device according to the application example, it is preferable that the spacer is made using a resin with a smaller dissipation factor value than the date wheel presser.

According to this application example, it is possible to reduce the loss of reception of the antenna due to the dissipation factor of the spacer. Generally, since power loss increases when the dissipation factor is large, it is disadvantageous for the antenna, but by using a resin with a smaller dissipation factor (for example, about $1 \times 10^{-4}$) than the date wheel presser as the material of the spacer, it is possible to reduce the loss of reception of the antenna.

Application Example 32

In the portable electronic device according to the application example, it is preferable that the spacer and the date wheel presser are integrally formed with the resin.

According to this application example, since the spacer and the date wheel presser are integrally formed with a resin having a small dissipation factor (for example, about $1 \times 10^{-}$ 4), it is possible to reduce power loss due to large dissipation factor, and reduce the loss of reception of the antenna.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
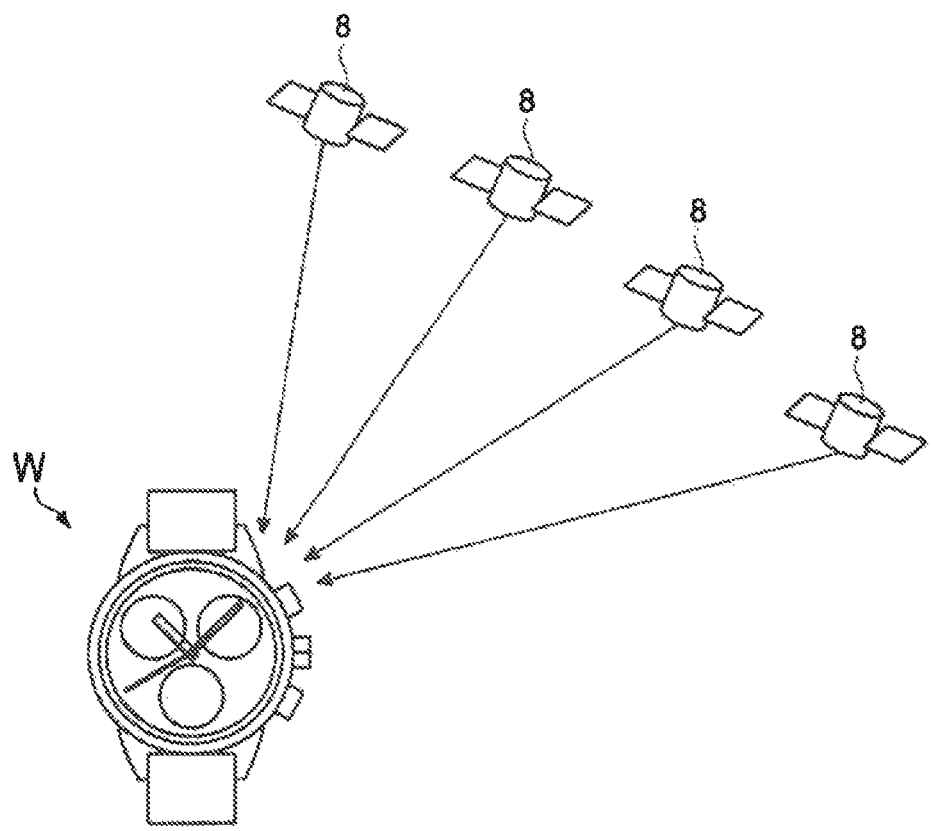
FIG. 1 is an overall view of a GPS including an electronic timepiece which is a portable electronic device of the invention.

Hereinafter, embodiments of the invention will be described with reference to the drawings. In the drawings, dimensions and scales of respective portions are appropriately different from actual ones. Further, since the embodiments described are preferred specific examples of the invention, various technically preferable limitations are given, but unless there is no statement specifically limiting the invention in the following description, the scope of the invention is not limited to these embodiments.

Embodiment

Figure 2:
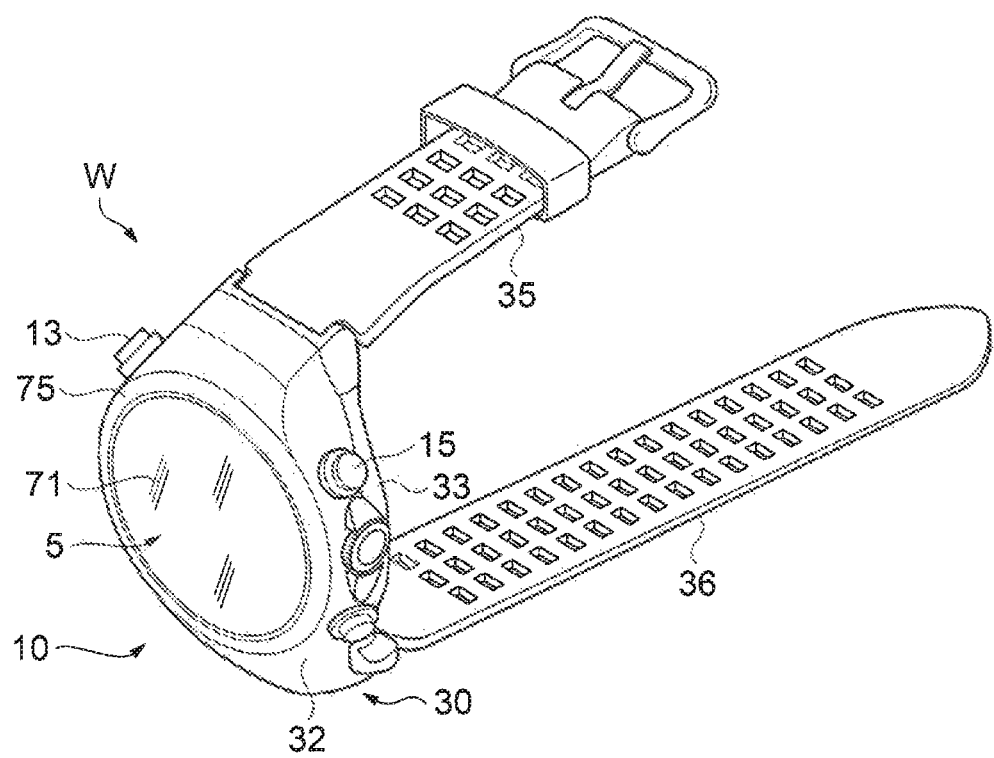
FIG. 2 is a perspective view showing the outline of the electronic timepiece according to a first embodiment.
Figure 3:
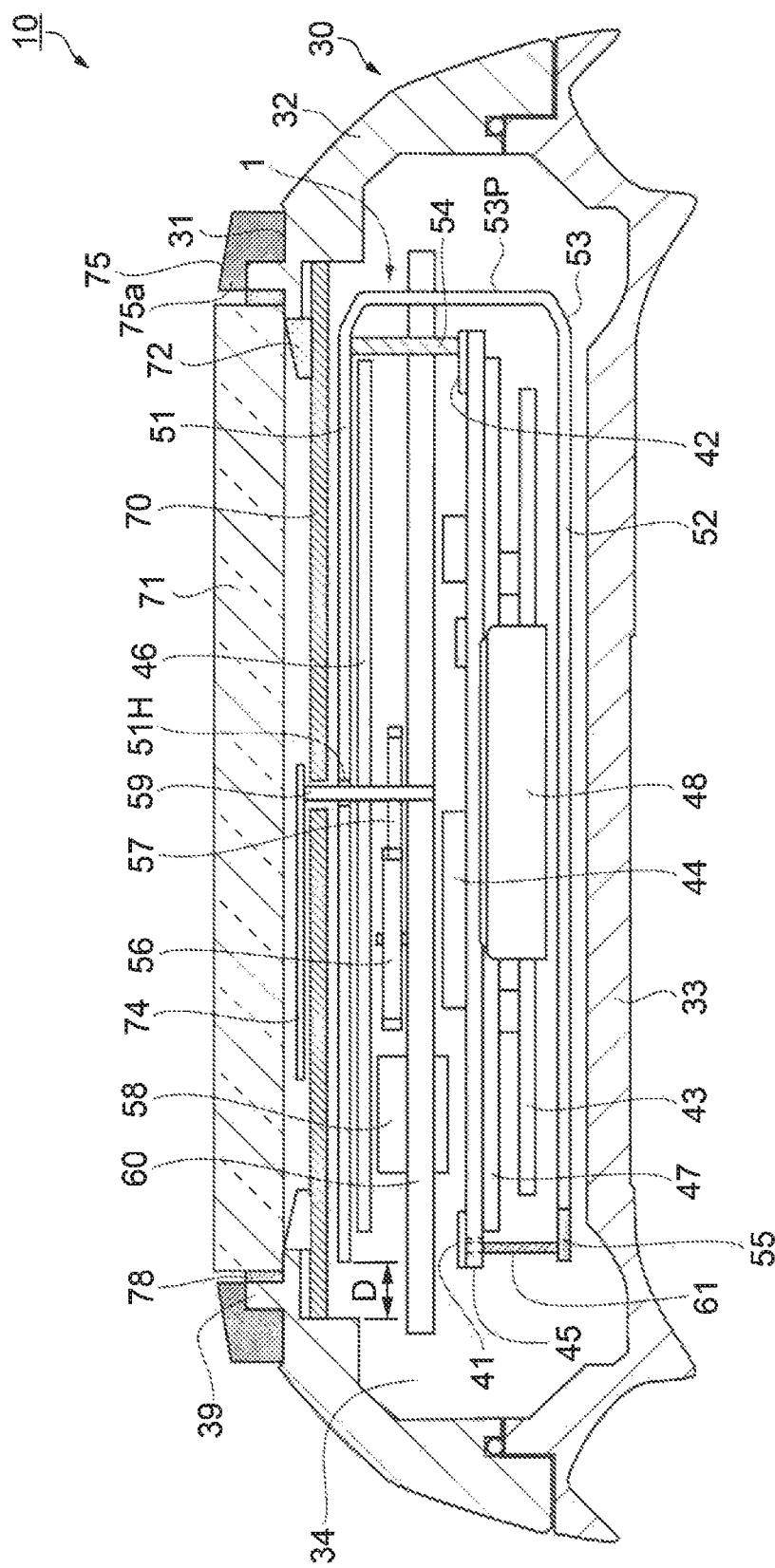
FIG. 3 is a cross-sectional view showing the internal configuration of the electronic timepiece according to the second embodiment.
Figure 4:
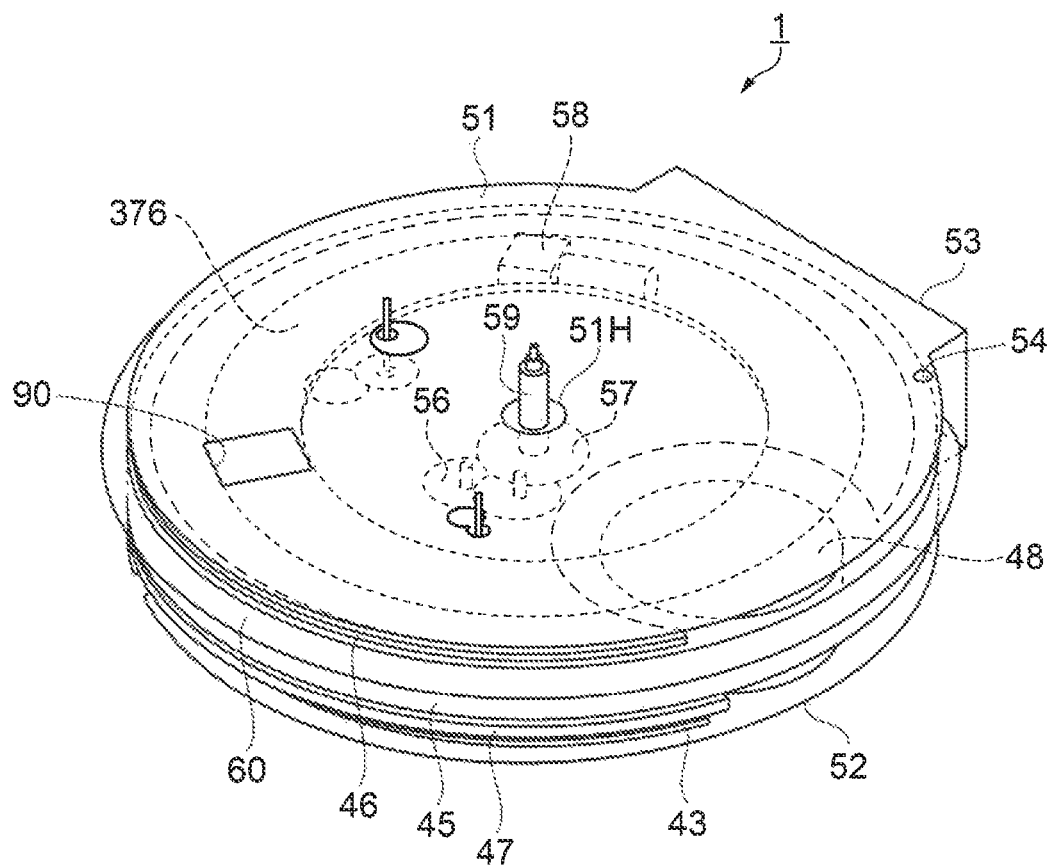
FIG. 4 is a perspective view schematically showing the internal structure of the electronic timepiece according to the first embodiment.
Figure 5A:
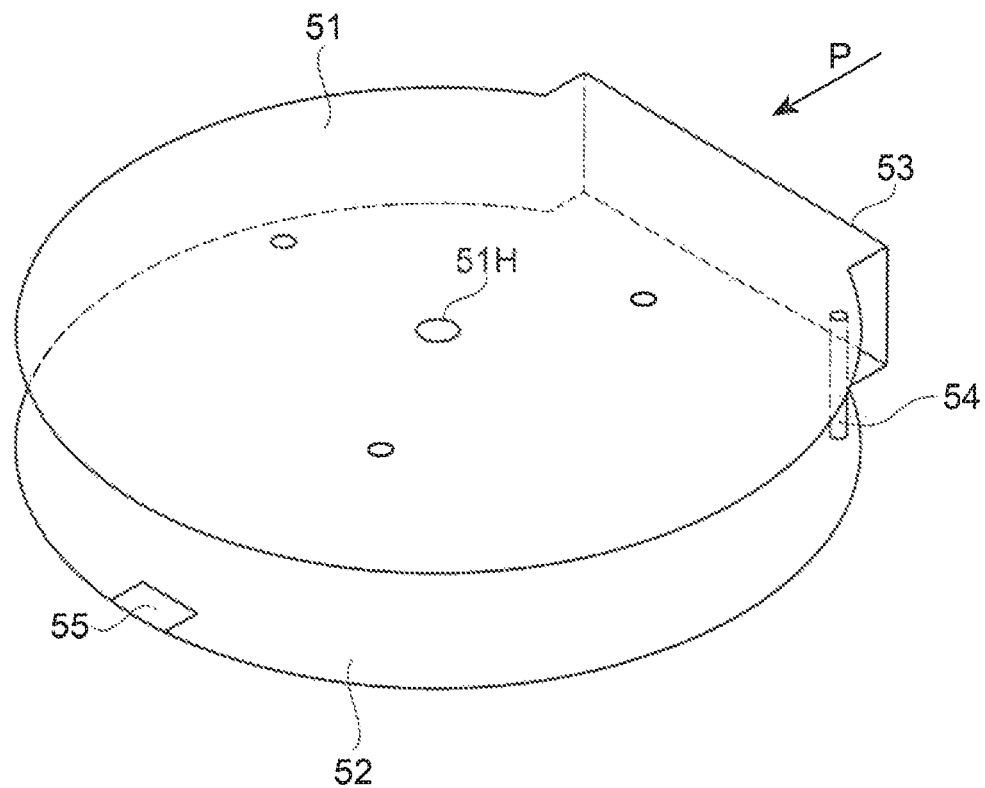
FIG. 5A is a perspective view showing a planar inverted F type antenna used in the electronic timepiece according to the first embodiment.
Figure 5B:
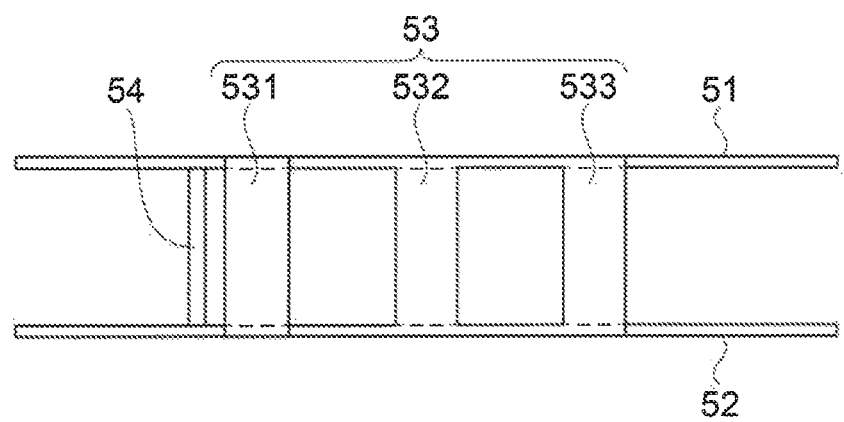
FIG. 5B is a view corresponding to a view taken along the line P in FIG. 5A, showing a modification example of the planar inverted-F antenna.

With reference to FIG. 1, FIG. 2, FIG. 3, FIG. 4, FIG. 5A, and FIG. 5B, an electronic time piece which is a portable electronic device according to the invention will be described. FIG. 1 is an overall view of a GPS including an electronic timepiece which is a portable electronic device according to the invention. FIG. 2 is a perspective view showing the outline of the electronic timepiece according to a first embodiment. FIG. 3 is a cross-sectional view showing the internal configuration of the electronic timepiece according to the first embodiment. FIG. 4 is a perspective view schematically showing the internal structure of the electronic timepiece according to the first embodiment. FIG. 5A is a perspective view showing a planar inverted F type antenna used in the electronic timepiece according to the first embodiment. FIG. 5B is a view corresponding to a view taken along the line P in FIG. 5A, showing a modification example of the planar inverted-F antenna.

The electronic timepiece W which is a portable electronic device has at least a function of a watch that receives a radio wave (satellite signal) from a GPS satellite 8 and corrects an internal time, and a positioning calculation (position Information acquisition) function using GPS time information and orbit information. Then, the electronic timepiece W displays time information, position information, or the like on a display unit 5 located on the side opposite side to the surface on the side in contact with the user's arm, with the indication needle 74 or the like. In the following description, the side in contact with the user's arm of the electronic timepiece W may be referred to as a back surface side, and the opposite side thereof may be referred to as a front surface side. In addition, a case viewed from the front surface side along the direction from the back surface side to the front surface side may be referred to as "plan view" in some cases.

First Embodiment

As shown in FIG. 1, the GPS satellite 8 is an example of a position information satellite circling on a predetermined orbit in the sky above the earth. The GPS satellite 8 transmits radio waves of a high frequency superimposed with a navigation message, for example, radio waves of 1.57542 GHz (L1 wave) to the ground. In the following description, the radio waves of 1.57542 GHz superimposed with a navigation message is referred to as a satellite signal. The satellite signal is the circularly polarized wave of the right-handed polarized wave.

Currently, there is a plurality of GPS satellites 8 (only four are shown in FIG. 1). In order to identify from which GPS satellite 8 the satellite signal is transmitted, each GPS satellite 8 superimpose specific patterns of 1023 chips (1 ms period) called a coarse/acquisition code (C/A code) on the satellite signal.

In the C/A code, each chip is either +1 or −1, and it looks like a random pattern. Therefore, it is possible to detect the C/A code superimposed on the satellite signal, by correlating the satellite signal with the pattern of each C/A code.

The GPS satellite 8 is provided with an atomic timepiece. The satellite signal includes extremely accurate GPS time information timed by the atomic timepiece. A small time error of the atomic timepiece provided in each GPS satellite 8 is measured by ground control segments. The satellite signal also includes a time correction parameter for correcting the time error. The electronic timepiece W receives satellite signals (radio waves) transmitted from one GPS satellite 8, and acquires time information by using the GPS time information and the time correction parameter contained therein. The operation mode in which the time information can be acquired is referred to as "timekeeping mode", and the internal time (minute and second) of the electronic timepiece W can be corrected using the acquired time information.

The satellite signal also includes orbit information indicating the position on the orbit of the GPS satellite 8. The electronic timepiece W can perform positioning calculation using the GPS time information and the orbit information. The positioning calculation is performed on the premise that a certain degree of error is included in the internal time of the electronic timepiece W. That is, in addition to the x, y, z parameters for specifying the three-dimensional position of the electronic timepiece W, the time error is also an unknown number. Therefore, the electronic timepiece W receives satellite signals (radio waves) respectively transmitted from, for example, three or more GPS satellites 8, and performs positioning calculation using the GPS time information and the orbit information included therein, thereby acquiring the position information of the current position. The operation mode in which the position information can be acquired is referred to as "positioning mode", the time difference is corrected based on the acquired position information, and the local time can be automatically displayed. Since the receiving operation in the positioning mode has higher power consumption than the receiving operation in the timekeeping mode described above, it is preferable that the correcting operation (manual reception or automatic reception) of the internal time in the use environment not requiring the time difference correction is executed in the timekeeping mode.

As shown in FIG. 2, the electronic timepiece W is mounted on a given site (for example, a wrist) of the user and displays the current time, user's position information and movement information (physical quantity information), and the like. The electronic timepiece W includes a device body 10 which is mounted on the user and detects and displays the current time, the user's position information and movement information (physical quantity information), and the like, and band portions 35 and 36 which are attached to the device body 10 and are used to mount the device body 10 on the user. The electronic timepiece W may have a function of detecting and displaying biological information such as pulse wave information by a pulse wave sensor, in addition to the current time and the user's position information and movement information (physical quantity information).

In the device body 10, as the case 30, a bottom case 33 is disposed on the mounting side of the user, and a top case 32 is disposed on a side opposite to the mounting side of the user. The bottom case 33 and the top case 32 can be made of, for example, metal such as stainless steel, resin, or the like, but they are preferably made of metal. Since the bottom case 33 and the top case 32 are made of metal, it is possible to shield disturbance noises from outside affecting the measurement accuracy of various constituent elements accommodated in the bottom case 33 and the top case 32. Moreover, it can make luxurious feeling and enhance fashionability. Further, the top case 32 and the bottom case 33 may not be separated from each other, or may be an integral structure or a configuration in which a back cover is provided on the mounting side of the user.

As shown in FIG. 3, the top case 32 is located on the outer edge side of the top case 32, and has a bottomed recessed portion 31 that opens toward the front surface side. The recessed portion 31 is provided in a ring shape along the outer edge of the top case 32. On the inner peripheral side of the recessed portion 31, a protrusion portion 39 protruding toward the front surface side is erected. At least a part of the bezel 75 is inserted and fixed to the recessed portion 31. The bezel 75 has an eaves portion 75a protruding toward a glass plate 71 side. The bezel 75 can be made of a material obtained by applying a plating treatment on the surface of a stainless steel material or a brass material, for example. Inside the bezel 75, the glass plate 71 for protecting the internal structure 1 is provided. The glass plate 71 is connected to the inner peripheral surface of the protrusion portion 39 through a joining member 78.

The device body 10 includes a display unit 5 (see FIG. 2) including a dial plate 70 provided directly below the glass plate 71, and has a configuration that allows the user to view the display of the display unit 5 through the glass plate 71. That is, in the electronic timepiece W according to the present embodiment, various types of information such as the detected position information, movement information (physical quantity information), time information or the like may be displayed on the display unit 5 and the display may be presented to the user from the top side of the device body 10. Note that the information displayed on the display unit 5 is, for example, the information itself included in the satellite signals received by the receiving unit, and the current time, the current position, the moving distance, the speed, or the like which are obtained by processing the received satellite signals. A plurality of buttons 13 and 15 (see FIG. 2) are provided on the side surface of the device body 10, for example, for switching display modes displayed on the display unit 5 and for switching the start and stop of hand movement of the indication needle 74.

Here, the example in which the top plate portion of the device body 10 is made of the glass plate 71 has been shown, but as long as it is a member having a light-transmitting property allowing the user to view the display unit 5, and having a strength enough to protect the configuration of the display unit 5 or the like included in the top case 32 and the bottom case 33, the top plate portion can be made of a material other than glass, such as transparent plastic. In addition, although a configuration example in which the bezel 75 is provided is shown, a configuration in which the bezel 75 is not provided may be adopted. Further, a solar panel (not shown) having a power generation function by sunlight or the like may be disposed on the front surface of the bezel 75 or on the front and back surfaces of the dial plate 70.

As shown in FIG. 3, the electronic timepiece W includes a dial plate 70, a parting plate 72 provided between the dial plate 70 and the glass plate 71, and an internal structure 1 accommodated in an internal space 34 that is configured with the dial plate 70, the top case 32 and the bottom case 33. As shown in FIG. 3 and FIG. 4, the internal structure 1 includes a planar inverted-F antenna including a first conductor element 51 and a second conductor element 52, a circuit substrate 45, a circuit substrate presser 43, a base plate 60, a first anti-magnetic plate 46, a second anti-magnetic plate 47, and a battery 48 as a feed portion.

Although a date wheel 376 can be provided between the first conductor element 51 and the first anti-magnetic plate 46 at the position shown in FIG. 4, illustration and explanation are omitted in the configuration shown in FIG. 3. The first conductor element 51 is provided with an opening 90 for allowing a part of the date wheel 376 to be visually recognized, and a day window (not shown) is provided at a position corresponding to the opening 90 of the first conductor element 51 of the dial plate 70.

The electronic timepiece W is provided with, as the internal structure 1, a power transmission mechanism including a step motor (motor) 58 which is a drive element for driving the indication needles 74 (including an hour hand, a minute hand, a second hand, or the like) of the display unit 5, and intermediate wheels (gears) 56 and 57 that transmit the rotation of the step motor 58 to a shaft 59 as a rotation shaft. In the electronic timepiece W, the rotation of the step motor 58 which is a drive source is decelerated by the intermediate wheels (gears) 56 and 57 and transmitted to the shaft 59, and rotation of the shaft 59 causes the indication needle 74 to rotate and move. The power transmission mechanism including the step motor 58, the intermediate wheels (gears) 56 and 57, and the shaft 59 is fixed to the base plate 60.

With reference also to FIG. 5A and FIG. 5B, the configuration of the planar inverted-F antenna will be described. A planar inverted F antenna or a planar inverted F antenna (PIFA) functions as an antenna for receiving high frequency radio waves (satellite signals) including GPS time information and orbit information from the GPS satellite 8.

The planar inverted-F antenna includes a planar first conductor element (radiation plate) 51 connected to a feed element 54 which is a feed portion, a planar second conductor element (ground plate) 52 which is disposed to overlap and face the first conductor element 51 in plan view and includes a ground portion 55, and a short circuit portion 53 that short-circuits the first conductor element 51 and the second conductor element 52. In addition, "in plan view" can be paraphrased as seen from the side of the glass plate 71 in the direction in which the internal structure 1, the dial plate 70, and the glass plate 71 are arranged. The planar inverted-F antenna has a structure in which the first conductor element 51 and the second conductor element 52 are short-circuited using the short-circuit portion 53 and power is supplied to the circuit substrate 45 by the feed element 54 to obtain radio wave radiation. A through hole 51H is provided at a position overlapping the shaft 59 or the like constituting the power transmission mechanism of the first conductor element 51 in plan view, and a shaft 59 is disposed in the through hole 51H such that the shaft 59 can be inserted from the back surface side of the first conductor element 51 to the front surface side (the dial plate 70 side).

Here, in the case of using the metal case 30, it is preferable that a distance D between the outer edge of the first conductor element 51 and the inner wall of the case 30 in a plan view is 1 mm or more. According to such an arrangement, it is possible to reliably and efficiently receive the GPS radio waves at the outer edge of the first conductor element 51 even in the case of the metal case 30. In the case of a resin case, the influence of the GPS radio waves passing through the resin case and being absorbed by the wrist, which is a given mounting site of the user, is large and the radiation efficiency is low (for example, about 45%). On the other hand, since the metal case 30 is used and the GPS radio waves are reflected by the metal case, it is possible to suppress the influence of the mounting site, increase the radiation efficiency (for example, 74%), and improve the reception performance of the planar inverted F type antenna.

It is preferable that the first conductor element 51 and the second conductor element 52 constituting the planar inverted F antenna are made of a metal thin plate such as copper, copper alloy, aluminum, aluminum alloy or the like. Since the first conductor element 51 and the second conductor element 52 are made of metal in this way, it is possible to reduce the thickness and to facilitate molding. Further, the first conductor element 51 and the second conductor element 52 are configured in which a non-conductive thin plate is used as a base material, and a metallic coating is formed on the front surface thereof. For example, the metallic coating can be formed by plating copper, silver, nickel, aluminum, or the like. Further, one of the first conductor element 51 and the second conductor element 52 may be made of metal, and the other may be a metal film formed on the base material.

The first conductor element 51 and the second conductor element 52 are connected by a plurality of short-circuit portions 53 provided at the outer edge portion. The short circuit portion 53 can be made of the same material as the first conductor element 51 and the second conductor element 52. The short-circuit portion 53 may be linearly formed so as to vertically connect the first conductor element 51 and the second conductor element 52, or may be formed to include a curved portion 53p expanding toward the outer periphery side as shown in FIG. 3. By providing such a curved portion 53p, the curved portion 53p can function as a buffering portion for buffering the impact received from the outside.

As shown in FIG. 5B, the short circuit portion 53 may include a plurality of connection portions 531, 532, and 533. In this way, since the short circuit portion 53 includes the plurality of connection portions 531, 532, and 533, the contact resistance of the short circuit portion 53 can be reduced, so that a larger amount of current can flow to the first conductor element 51 and the second conductor element 52.

Further, the first conductor element 51, it is preferable that the second conductor element 52, and the short circuit portion 53 are formed into a so-called integral structure, by using for example, a method of bending and molding a metal thin plate by press working, and the like. By applying such a configuration, it is possible to form the planar inverted-F antenna more efficiently.

The ground portion 55 included in the second conductor element 52 is electrically connected to the ground terminal 41 provided on the circuit substrate 45 through the connection terminal 61.

The feed element 54 which is a feed portion is disposed between the first conductor element 51 and the circuit substrate 45. The feed element 54 is connected to a feed terminal 42 provided on the circuit substrate 45, and has a function of supplying a signal received by the first conductor element 51 and the second conductor element 52 to a circuit on the circuit substrate 45.

The circuit substrate 45 is disposed between the first conductor element 51 and the second conductor element 52, and various conductive wires and conduction terminals are formed on an insulating substrate. Specifically, the ground terminal 41 and the feed terminal 42 are provided on the circuit substrate 45, as connection terminals of the planar inverted F antenna described above. The ground terminal 41 is connected to the ground portion 55 of the second conductor element 52, and the feed terminal 42 is connected to the first conductor element 51 through the feed element 54.

The circuit substrate 45 includes circuits such as a receiving circuit for processing the satellite signal received by the planar inverted F antenna and a control circuit for controlling driving of the step motor 58 constituting a driving element for rotating and moving the indication needle 74. The circuit substrate 45 is attached to the base plate 60 by a circuit substrate presser 43.

In addition, the control circuits included in the circuit substrate 45 includes for example, circuit elements 44 such as a digital signal processor (DSP), a central processing unit (CPU), a static random access memory (SRAM), and a crystal oscillator circuit with a real time clock (RTC) temperature compensation circuit (TCXO: a temperature compensated crystal oscillator), and a flash memory. The circuit substrate 45 including such a control circuit can control the driving elements such as the step motor 58.

For example, the base plate 60 is made of a non-conductive material such as plastic, and is disposed between the first conductor element 51 and the second conductor element 52. A power transmission mechanism including a step motor 58, intermediate wheels (gears) 56 and 57, and a shaft 59, or the like which is a driving element is attached to the base plate 60. Here, examples of resins used as raw materials for plastics used for the base plate 60 include thermoplastic resins such as acrylic (PMMA), polycarbonate (PC), polypropylene (PP), polyvinyl chloride (PVC), and acrylonitrile-butadiene-styrene copolymer (ABS resin), and thermosetting resins such as phenol resin (PF), epoxy resin (EP), melamine resin (MF), polyurethane resin (PUR), and silicone resin (SI).

Since the base plate 60 is made of a non-conductive material and disposed between the first conductor element 51 and the second conductor element 52, the non-conductive base plate 60 is regarded as a dielectric and a wavelength shortening effect due to the base plate 60 can be utilized. Thus, the planar inverted-F antenna configured with the first conductor element 51, the second conductor element 52, the short circuit portion 53 and the like can be miniaturized.

The first anti-magnetic plate 46 and the second anti-magnetic plate 47 are used for protecting the operation and the like of the step motor 58 from an external magnetic field, and are planar members which are made of, for example, pure iron or ferritic stainless steel, with high permeability and disposed between the base plate 60 and the circuit substrate 45. By adopting such an arrangement, it is possible to reduce the influence of the magnetic field received from the outside on the base plate 60 and the circuit substrate 45 disposed between the first anti-magnetic plate 46 and the second anti-magnetic plate 47. The first anti-magnetic plate 46 and the second anti-magnetic plate 47 are disposed between the first conductor element 51 and the second conductor element 52.

That is, in the internal structure 1 of the first embodiment, the first conductor element 51 and the second conductor element 52 are disposed between the first anti-magnetic plate 46, the base plate 60, the circuit substrate 45, and the second anti-magnetic plate 47. By adopting such an arrangement, compared with the case where the first anti-magnetic plate 46, the base plate 60, and the circuit substrate 45 is disposed separately from the planar inverted-F antenna including the first conductor element 51 and the second conductor element 52, the arrangement efficiency can be enhanced, and the thickness of the internal structure 1 can be reduced.

The battery 48 has terminals of both poles connected to the circuit substrate 45 by a connecting substrate (not shown) or the like, and supplies power to a circuit that controls the power. The power is supplied to each circuit by being converted into a predetermined voltage by this circuit, and causes each circuit and a control circuit that controls each circuit to operate. Although the primary battery is exemplified as the battery 48 in this case, a secondary battery that can be charged may be used as the battery 48.

According to the device body 10 (electronic timepiece W) according to Embodiment 1 having the internal structure 1 as described above, the non-conductive base plate 60 is regarded as a dielectric and the wavelength shortening effect by the base plate 60 is utilized, such that a planar inverted-F antenna configured with a planar first conductor element 51 connected to a feed element 54 which is a feed portion, a planar second conductor element 52 including a ground portion 55, and a short circuit portion 53 connecting the first conductor element 51 and the second conductor element 52 can be miniaturized. This makes it possible to accommodate the planar inverted-F antenna in the case 30 of the electronic timepiece W which is small portable electronic device and cause it to function as a GPS antenna. By accommodating the planar inverted-F antenna having such a structure in the case 30 (the bottom case 33 and the top case 32), a small electronic timepiece W can be realized.

Figure 6A:
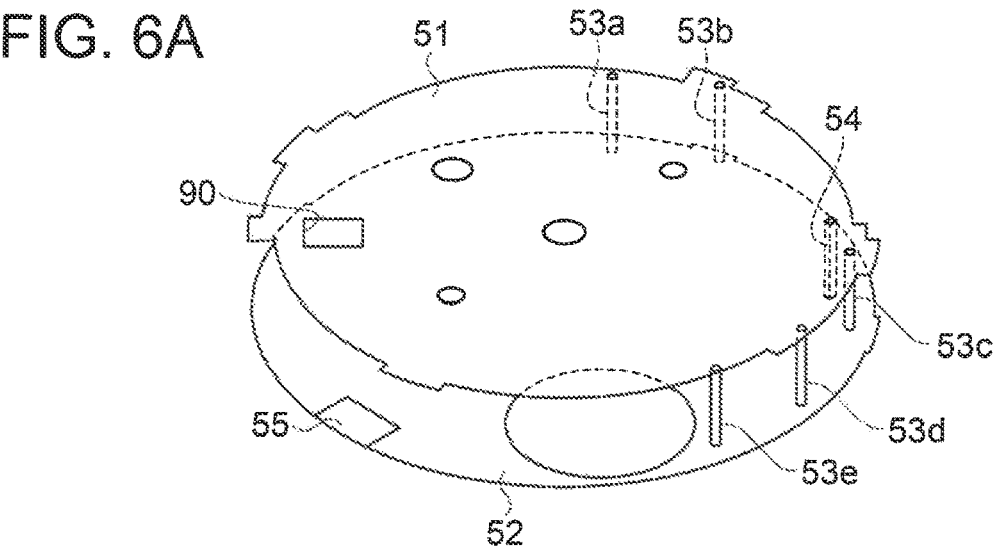
FIG. 6A is a perspective view showing a modification example of the planar inverted F type antenna used in the electronic timepiece according to the first embodiment.
Figure 6B:
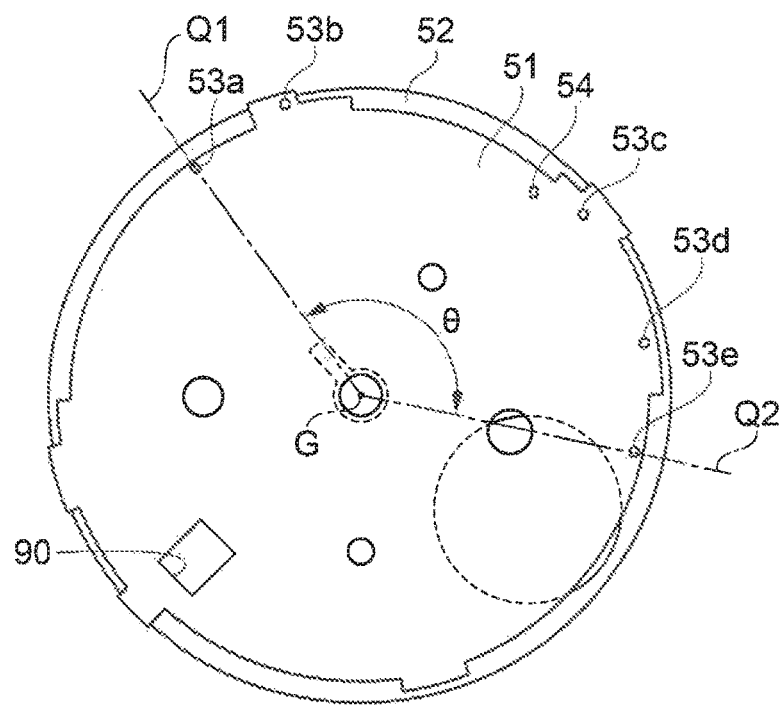
FIG. 6B is a plan view of the planar inverted-F antenna shown in FIG. 6A.
Figure 6C:
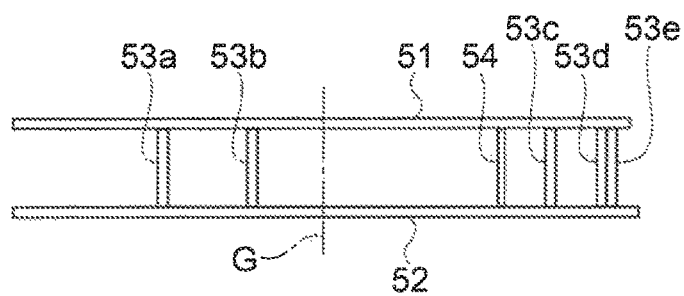
FIG. 6C is a front view of FIG. 6B showing the planar inverted-F antenna.

In the internal structure 1 according to the first embodiment described above, the planar inverted-F antenna can be configured as shown in the following modification example. The modification example of the planar inverted-F antenna will be described below with reference to FIG. 6A, FIG. 6B, and FIG. 6C. FIG. 6A is a perspective view showing a modification example of the planar inverted F type antenna used in the electronic timepiece according to the first embodiment. FIG. 6B is a plan view of the planar inverted-F antenna shown in FIG. 6A. FIG. 6C is a front view of FIG. 6B showing the planar inverted-F antenna. The planar inverted-F antenna of the modification example is different from the configuration of the first embodiment described above in the configuration of the short circuit portion. Since the first conductor element, the second conductor element, and the feed element which is a feed portion having other configurations have the same configuration as that of the first embodiment, the same reference numerals are given and the description thereof will be omitted.

The planar inverted-F antenna of the modification example includes a planar first conductor element (radiation plate) 51 connected to a feed element 54 which is a feed portion, a planar second conductor element (ground plate) 52 which is disposed to overlap and face the first conductor element 51 in plan view and includes a ground portion 55, and a plurality of rod-like short circuit portions 53*a*, 53*b*, 53*c*, 53*d*, and 53*e* short-circuiting the first conductor element 51 and the second conductor element 52. In the first embodiment, the first conductor element 51, the second conductor element 52, and the short circuit portion 53 are formed as an integral structure, but in the modification example, they are formed separately.

The plurality of short circuit portions 53*a*, 53*b*, 53*c*, 53*d*, and 53*e* are disposed with intervals along the outer edge portion of the first conductor element 51, respectively. In the arrangement of the plurality of short circuit portions 53*a*, 53*b*, 53*c*, 53*d*, and 53*e*, it is preferable that an angle $\theta$ between a first imaginary line Q1 connecting the short circuit portion 53*a* located at one end and the center G of the first conductor element 51, and a second imaginary line Q2 connecting the short circuit portion 53*e* located at the other end and the center G of the first conductor element 51 satisfies 0 degrees$<\theta\leq$170 degrees. Note that other short circuit portions 53*b*, 53*c*, and 53*d* are disposed between the short circuit portion 53a located at one end and the short circuit portion 53e located at the other end.

By providing the plurality of short circuit portions 53a, 53b, 53c, 53d, and 53e in this manner, it is possible to reduce the resistance of the planar inverted-F antenna and to reduce the loss of the planar inverted-F antenna itself. Further, in the configuration in which the first anti-magnetic plate 46, the base plate 60, the circuit substrate 45, and the second anti-magnetic plate 47 are disposed between the first conductor element 51 and the second conductor element 52, as described above, by disposing the short circuit portions 53a, 53b, 53c, 53d, and 53e, it is possible to increase the resonance frequency of the planar inverted-F antenna to resonate at the frequency of the satellite radio waves to be received. Thus, the planar inverted-F antenna shown in the modification example can be an antenna with a small size and improved reception performance.

Second Embodiment

Figure 7:
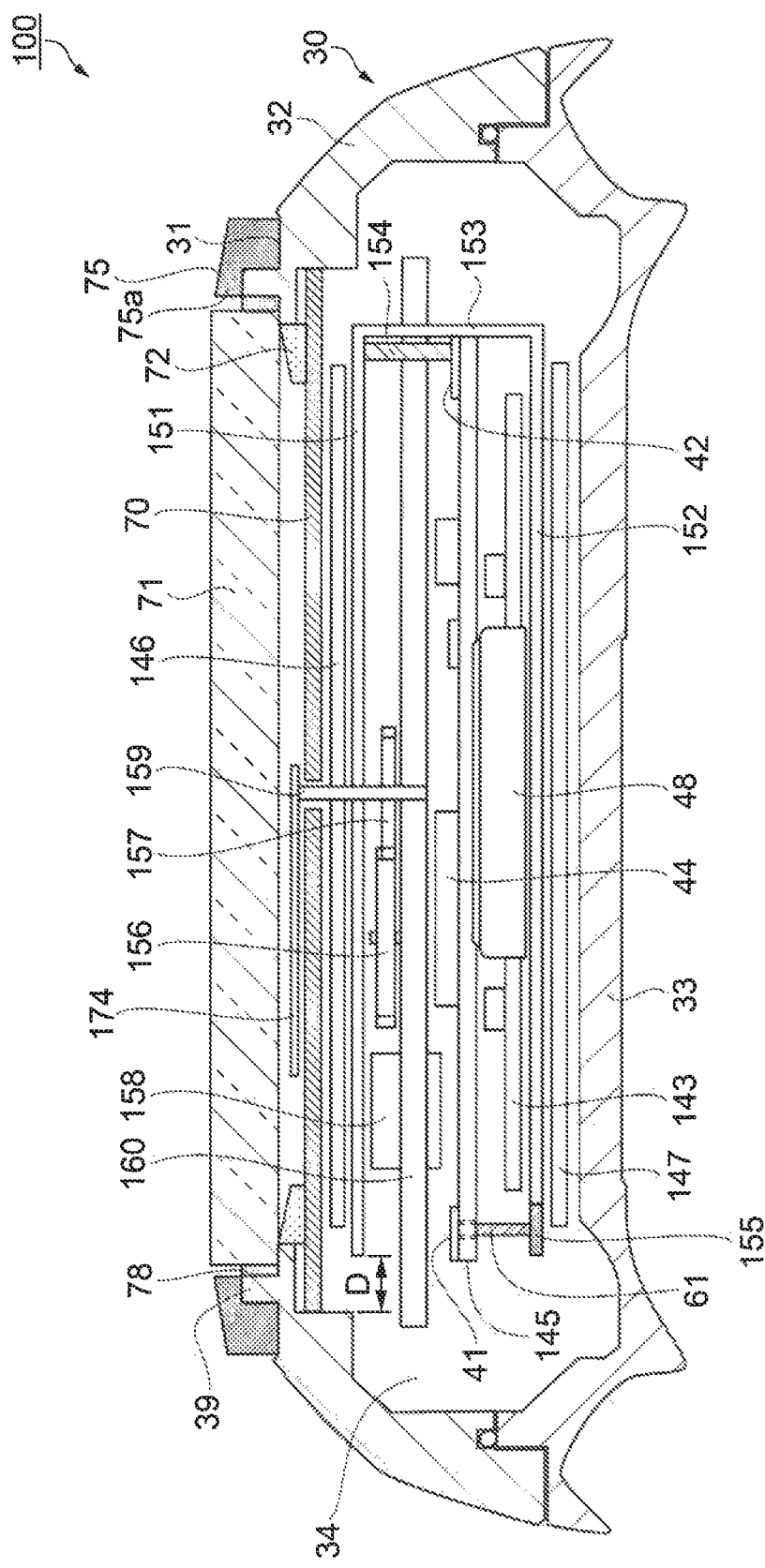
FIG. 7 is a cross-sectional view showing the internal configuration of the electronic timepiece according to a second embodiment.

Next, the configuration of the electronic timepiece according to a second embodiment of the portable electronic device according to the invention will be described with reference to FIG. 7. FIG. 7 is a cross-sectional view showing the internal configuration of the electronic timepiece according to the second embodiment. The device body 100 of the electronic timepiece according to the second embodiment shown in FIG. 7 differs from the device body 10 of the first embodiment described above in the arrangement position of the constituent elements. In the following description, the arrangement configuration different from the above-described first embodiment will be mainly described, and similar forms and configurations are denoted by the same reference numerals and description thereof will be omitted.

As shown in FIG. 7, a device body 100 according to the second embodiment is provided with, as an internal structure, a power transmission mechanism including a step motor (motor) 158 which is a drive element for driving the indication needles 174 (including an hour hand, a minute hand, a second hand, or the like), and intermediate wheels (gears) 156 and 157 that transmit the rotation of the step motor 158 to a shaft 159. Further, the device body 100 includes a dial plate 70, a parting plate 72 provided between the dial plate 70 and the glass plate 71, and an internal structure accommodated in an internal space 34 that is configured with the dial plate 70, the top case 32 and the bottom case 33. The internal structure includes a planar inverted-F antenna including a planar first conductor element 151 connected to a feed element 154, a planar second conductor element 152 including a ground portion 155, and a short circuit portion 153 short-circuiting the first conductor element 151 and the second conductor element 152, a circuit substrate 145, a circuit substrate presser 143, a base plate 160, a first anti-magnetic plate 146, a second anti-magnetic plate 147, and a battery 48. Since the configurations of the planar inverted-F antenna including the first conductor element 151 and the second conductor element 152, the circuit substrate 145, the circuit substrate presser 143, the base plate 160, the first anti-magnetic plate 146, the second anti-magnetic plate 147, and the battery 48, as the internal structure, are similar to the first embodiment, and the explanation below will be omitted.

In the device body 100, the first conductor element 151, the base plate 160, the circuit substrate 145, the circuit substrate presser 143, and the second conductor element 152 are disposed between the first anti-magnetic plate 146 and the second anti-magnetic plate 147. That is, in the internal structure of the device body 100 of the second embodiment, a base plate 160, a circuit substrate 145, and a circuit substrate presser 143 are disposed between the first conductor element 151 and the second conductor element 152, a first anti-magnetic plate 146 is positioned on the dial plate 70 side of the first conductor element 151, and a second anti-magnetic plate 147 is positioned on the bottom case 33 side of the second conductor element 152. The first conductor element 151 is connected to the circuit substrate 145 by the feed element 154. The second conductor element 152 is connected to the circuit substrate 145 by the connection terminal 61.

According to the configuration of the internal structure of the device body 100 according to the second embodiment, it is possible to achieve the same effect as the first embodiment. Further, by disposing the first conductor element 151, the base plate 160, the circuit substrate 145, and the second conductor element 152 between the first anti-magnetic plate 146 and the second anti-magnetic plate 147, it is possible to reduce the current loss caused by flow of current to the first anti-magnetic plate 146 and the second anti-magnetic plate 147.

Third Embodiment

Figure 8:
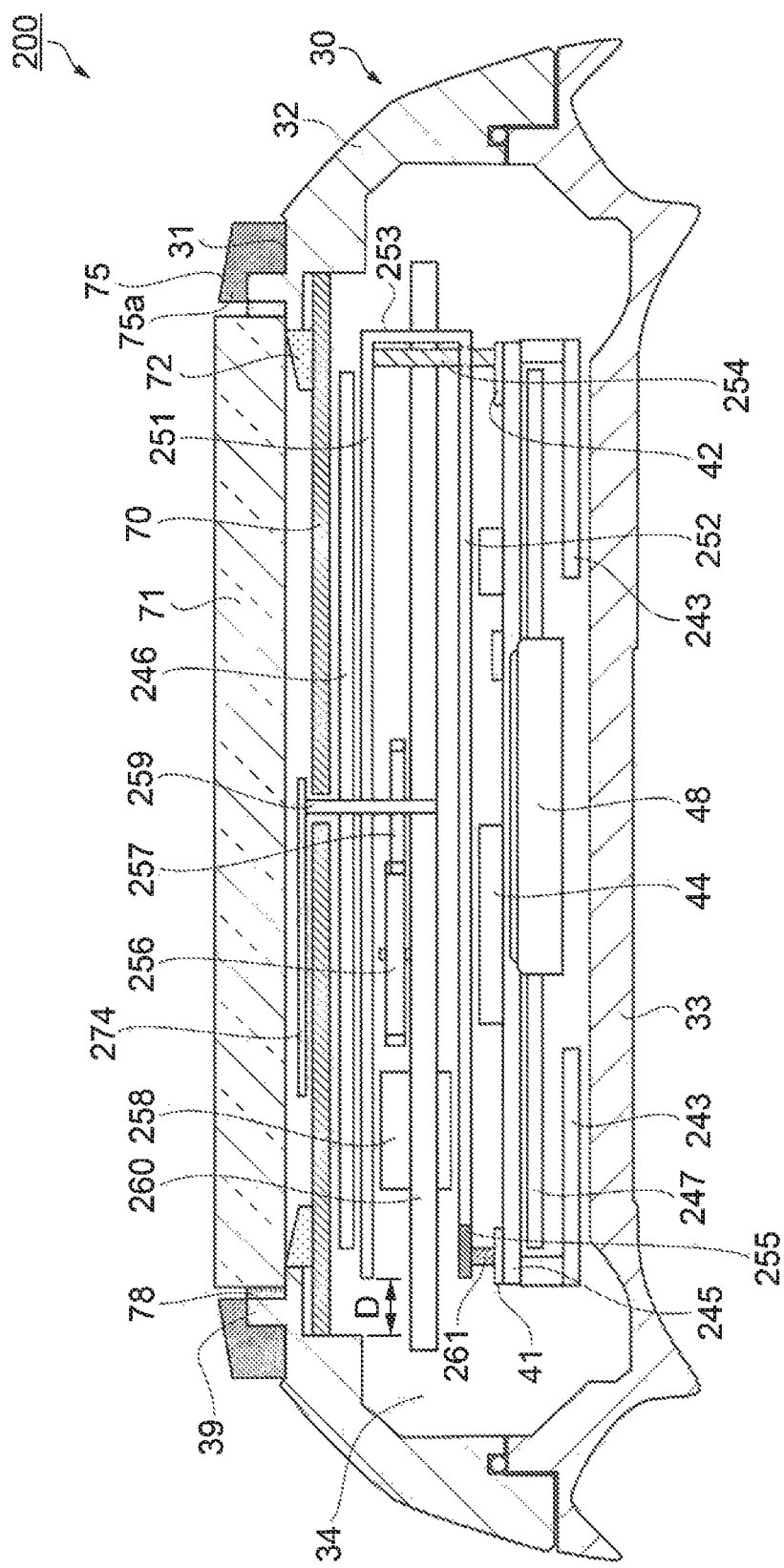
FIG. 8 is a cross-sectional view showing the internal configuration of the electronic timepiece according to a third embodiment.

Next, the configuration of the electronic timepiece according to a third embodiment of the portable electronic device according to the invention will be described with reference to FIG. 8. FIG. 8 is a cross-sectional view showing the internal configuration of the electronic timepiece according to the third embodiment. The device body 200 of the electronic timepiece according to the third embodiment shown in FIG. 8 differs from the device body 10 of the first embodiment described above in the arrangement position of the constituent elements. In the following description, the arrangement configuration different from the above-described first embodiment will be mainly described, and similar forms and configurations are denoted by the same reference numerals and description thereof will be omitted.

As shown in FIG. 8, a device body 200 according to the third embodiment is provided with, as an internal structure, a power transmission mechanism including a step motor (motor) 258 which is a drive element for driving the indication needles 274 (including an hour hand, a minute hand, a second hand, or the like), and intermediate wheels (gears) 256 and 257 that transmit the rotation of the step motor 258 to a shaft 259. Further, the device body 200 includes a dial plate 70, a parting plate 72 provided between the dial plate 70 and the glass plate 71, and an internal structure accommodated in an internal space 34 that is configured with the dial plate 70, the top case 32 and the bottom case 33. The internal structure includes a planar inverted-F antenna including a planar first conductor element 251 connected to a feed element 254, a planar second conductor element 252 including a ground portion 255, and a short circuit portion 253 short-circuiting the first conductor element 251 and the second conductor element 252, a circuit substrate 245, a circuit substrate presser 243, a base plate 260, a first anti-magnetic plate 246, a second anti-magnetic plate 247, and a battery 48. Since the configurations of planar inverted-F antenna including the first conductor element 251 and the second conductor element 252, the circuit substrate 245, the circuit substrate presser 243, the base plate 260, the first anti-magnetic plate 246, the second anti-magnetic plate 247, and the battery 48, as the internal structure, are similar to the first embodiment, and the explanation below will be omitted.

In the device body 200, a first conductor element 251 is disposed between the first anti-magnetic plate 246 and the base plate 260, and a second conductor element 252 is disposed between the base plate 260 and the circuit substrate 245. The circuit substrate 245 is disposed between the second anti-magnetic plate 247 and the second conductor element 252. That is, a base plate 260, a first conductor element 251, a second conductor element 252, and a circuit substrate 245 are disposed between the first anti-magnetic plate 246 and the second anti-magnetic plate 247. In the present embodiment, the circuit substrate presser 243 is disposed on the bottom case 33 side of the second anti-magnetic plate 247.

According to the configuration of the internal structure of the device body 200 according to the third embodiment, it is possible to achieve the same effect as the first embodiment. Further, by disposing the first conductor element 251 and the second conductor element 252, with the base plate 260 interposed therebetween, and the circuit substrate 245 between the first anti-magnetic plate 246 and the second anti-magnetic plate 247, it is possible to reduce the current loss caused by flow of current to the first anti-magnetic plate 246 and the second anti-magnetic plate 247.

Fourth Embodiment

Figure 9:
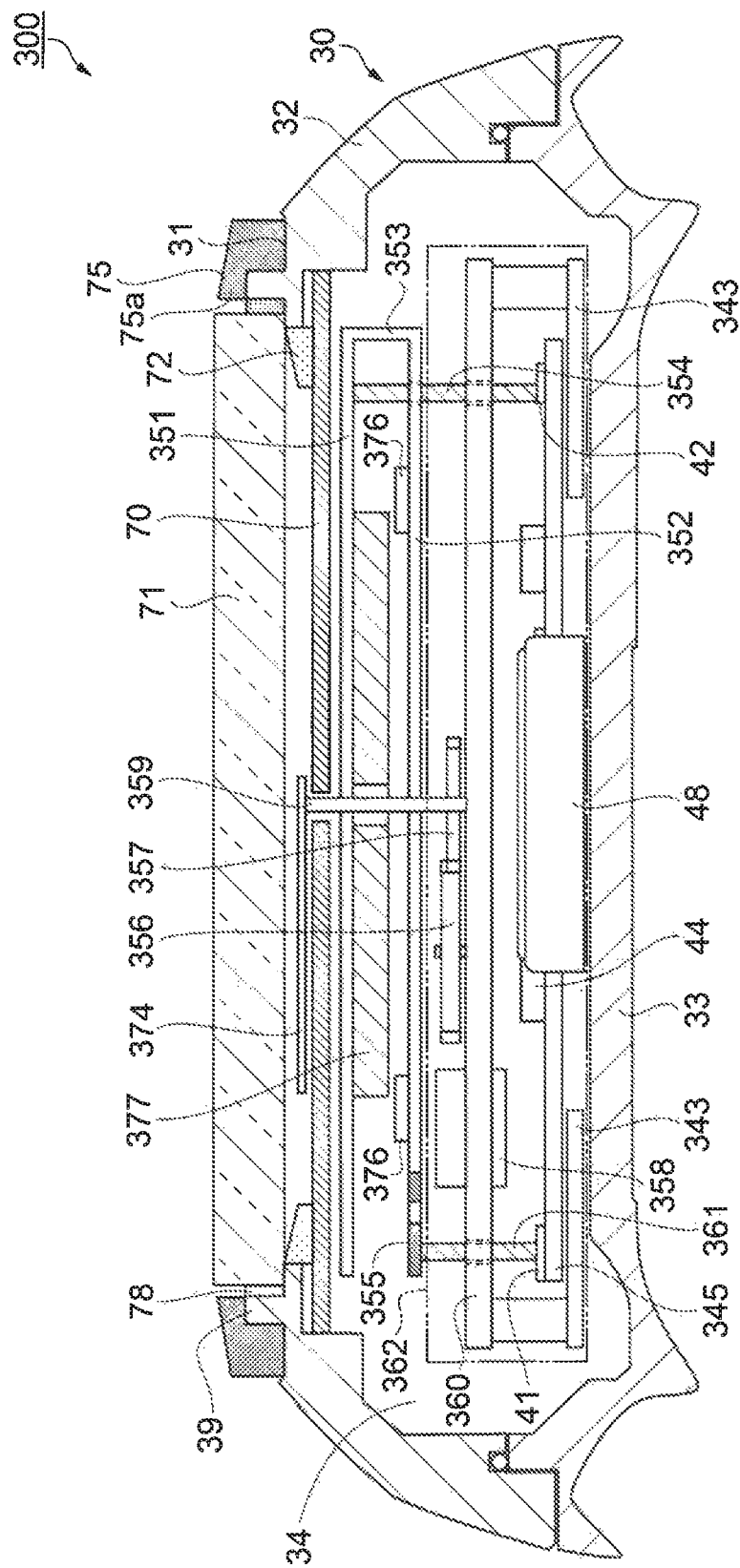
FIG. 9 is a cross-sectional view showing the internal configuration of the electronic timepiece according to a fourth embodiment.

Next, the configuration of the electronic timepiece according to a fourth embodiment of the portable electronic device according to the invention will be described with reference to FIG. 9. FIG. 9 is a cross-sectional view showing the internal configuration of the electronic timepiece according to the fourth embodiment. A device body 300 of the electronic timepiece according to the fourth embodiment shown in FIG. 9 differs from the device body 10 of the first embodiment described above in the arrangement position of the constituent elements. In the following description, the arrangement configuration different from the above-described first embodiment will be mainly described, and similar forms and configurations are denoted by the same reference numerals and description thereof will be omitted.

As shown in FIG. 9, a device body 300 according to the fourth embodiment is provided with, as an internal structure, a power transmission mechanism including a step motor (motor) 358 which is a drive element for driving the indication needles 374 (including an hour hand, a minute hand, a second hand, or the like), and intermediate wheels (gears) 356 and 357 that transmit the rotation of the step motor 358 to a shaft 359. Further, the device body 300 includes a dial plate 70, a parting plate 72 provided between the dial plate 70 and the glass plate 71, and an internal structure accommodated in an internal space 34 that is configured with the dial plate 70, the top case 32 and the bottom case 33. The internal structure includes a planar first conductor element 351 connected to the feed element 354, a planar second conductor element 352 including the ground portion 355, a short circuit portion 353 short-circuiting the first conductor element 351 and the second conductor element 352, the planar inverted-F antenna, a circuit substrate 345, a circuit substrate presser 343, a base plate 360, a date wheel 376 connected to the base plate 360, a date wheel presser 377, and a battery 48. Since the configurations of planar inverted-F antenna including the first conductor element 351 and the second conductor element 352, the circuit substrate 345, the circuit substrate presser 343, the base plate 360, and the battery 48, as the internal structure, are similar to the first embodiment, and the explanation below will be omitted.

In the device body 300, a first conductor element 351 and a second conductor element 352 facing the first conductor element 351 are disposed between the dial plate 70 and the base plate 360. A date wheel 376 and a date wheel presser 377 made of a non-conductive material are disposed between the first conductor element 351 and the second conductor element 352. On the side opposite to the side of the first conductor element 351 of the second conductor element 352, a base plate 360 disposed to overlap the second conductor element 352, a power transmission mechanism including a step motor 358 which is a driving element connected to the base plate 360, intermediate wheels (gears) 356 and 357, and a shaft 359, and a movement 362 including a circuit substrate 345, a circuit substrate presser 343, or the like are disposed.

In other words, in the device body 300, a planar inverted-F antenna including a first conductor element 351 and a second conductor element 352 between which a date wheel 376 and a date wheel presser 377 made of a non-conductive material are interposed, a power transmission mechanism including a base plate 360, a step motor 358 which is a driving element connected to the base plate 360, intermediate wheels (gears) 356 and 357, and a shaft 359, and a movement 362 including a circuit substrate 345, a circuit substrate presser 343, or the like are disposed to overlap each other in plan view. A configuration is possible in which the first anti-magnetic plate and the second anti-magnetic plate (not shown) are disposed.

Note that as the materials of the date wheel 376 and the date wheel presser 377, which are made of a non-conductive material, for example, thermoplastic resins such as acrylic (PMMA), polycarbonate (PC), polypropylene (PP), polyvinyl chloride (PVC), and acrylonitrile-butadiene-styrene copolymer (ABS resin), or thermosetting resins such as phenol resin (PF), epoxy resin (EP), melamine resin (MF), polyurethane resin (PUR), and silicone resin (SI) can be exemplified.

According to such a device body 300 of the fourth embodiment, the non-conductive date wheel 376 and the date wheel presser 377 are regarded as dielectrics, and a wavelength shortening effect due to the date wheel 376 and the date wheel presser 377 is utilized, such that the planar inverted-F antenna configured to include the planar first conductor element 351, the planar second conductor element 352, and the short circuit portion 353 connecting the first conductor element 351 and the second conductor element 352 can be miniaturized. Further, since the movement 362 is disposed so as to overlap the second conductor element 352 on the side opposite to the first conductor element 351 side of the second conductor element 352, the arrangement efficiency can be enhanced. This makes it possible to accommodate the planar inverted-F antenna and the movement 362 in the case of a small portable electronic device (for example, a watch).

Figure 10A:
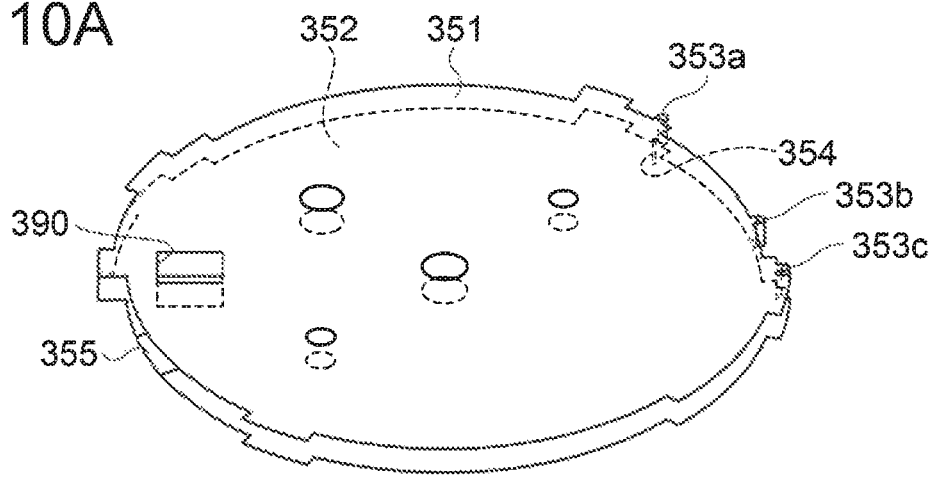
FIG. 10A is a perspective view showing a modification example of the planar inverted F type antenna used in the electronic timepiece according to the fourth embodiment.
Figure 10B:
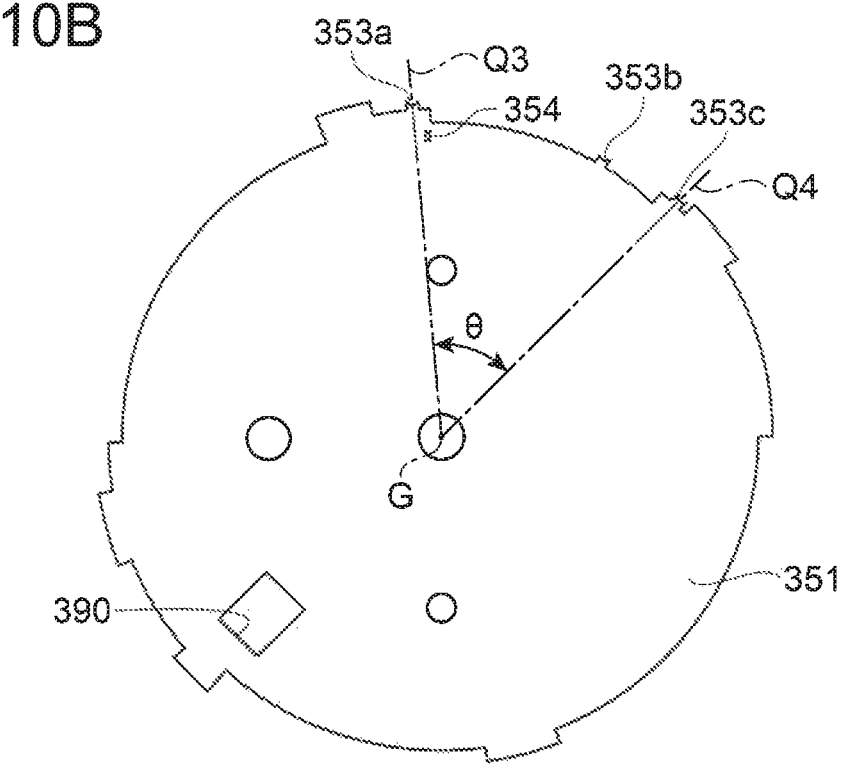
FIG. 10B is a plan view of the planar inverted-F antenna shown in FIG. 10A.
Figure 10C:
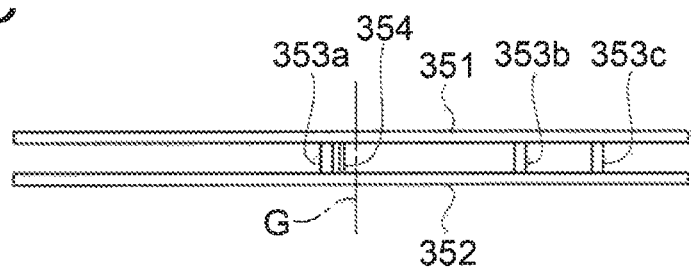
FIG. 10C is a front view of FIG. 10B showing the planar inverted-F antenna.

In the internal structure according to the fourth embodiment described above, the planar inverted-F antenna can be configured as shown in the following modification example. The modification example of the planar inverted-F antenna will be described below with reference to FIG. 10A, FIG. 10B, and FIG. 10C. FIG. 10A is a perspective view showing a modification example of the planar inverted F type antenna used in the electronic timepiece according to the fourth embodiment. FIG. 10B is a plan view of the planar inverted-F antenna shown in FIG. 10A. FIG. 10C is a front view of FIG. 10B showing the planar inverted-F antenna. The planar inverted-F antenna of the modification example is different from the configuration of the short circuit portion 353 of the fourth embodiment described above. Since the first conductor element 351, the second conductor element 352, and the feed element 354 which is a feed portion having other configurations have the same configuration as that of the fourth embodiment, the same reference numerals are given and the description thereof will be omitted.

The planar inverted-F antenna of the modification example includes a planar first conductor element (radiation plate) 351 including the feed element 354 which is a feed portion and the opening 390, a planar second conductor element (ground plate) 352 which is disposed to overlap and face the first conductor element 351 in plan view and includes a ground portion 355, and a plurality of short circuit portions 353a, 353b, and 353c short-circuiting the first conductor element 351 and the second conductor element 352. Here, the first conductor element 351 and the second conductor element 352 constituting the planar inverted-F antenna of the modification example is disposed between the date wheel 376 and date wheel presser 377 made of a non-conductive material (FIG. 9).

The plurality of short circuit portions 353a, 353b, and 353c are disposed with an interval along the outer edge portion of the first conductor element 351. In the arrangement of the plurality of short circuit portions 353a, 353b, and 353c, it is preferable that an angle θ between a first imaginary line Q3 connecting the short circuit portion 353a located at one end and the center G of the first conductor element 351, and a second imaginary line Q4 connecting the short circuit portion 353c located at the other end and the center G of the first conductor element 351 satisfies 0 degrees<θ≤90 degrees. Note that another short circuit portion 353b is disposed between the short circuit portion 353a located at one end and the short circuit portion 353c located at the other end.

By providing the plurality of short circuit portions 353a, 353b, and 353c in this manner, it is possible to reduce the resistance of the planar inverted-F antenna and to reduce the loss of the planar inverted-F antenna itself. Further, in the configuration in which the date wheel 376 and date wheel presser 377 made of a non-conductive material are disposed between the first conductor element 351 and the second conductor element 352, as described above, by disposing the short circuit portions 353a, 353b, and 353c, it is possible to increase the resonance frequency of the planar inverted-F antenna to resonate at the frequency of the satellite radio waves to be received. Thus, the planar inverted-F antenna shown in this modification example can be an antenna with improved reception performance.

Fifth Embodiment

Figure 11:
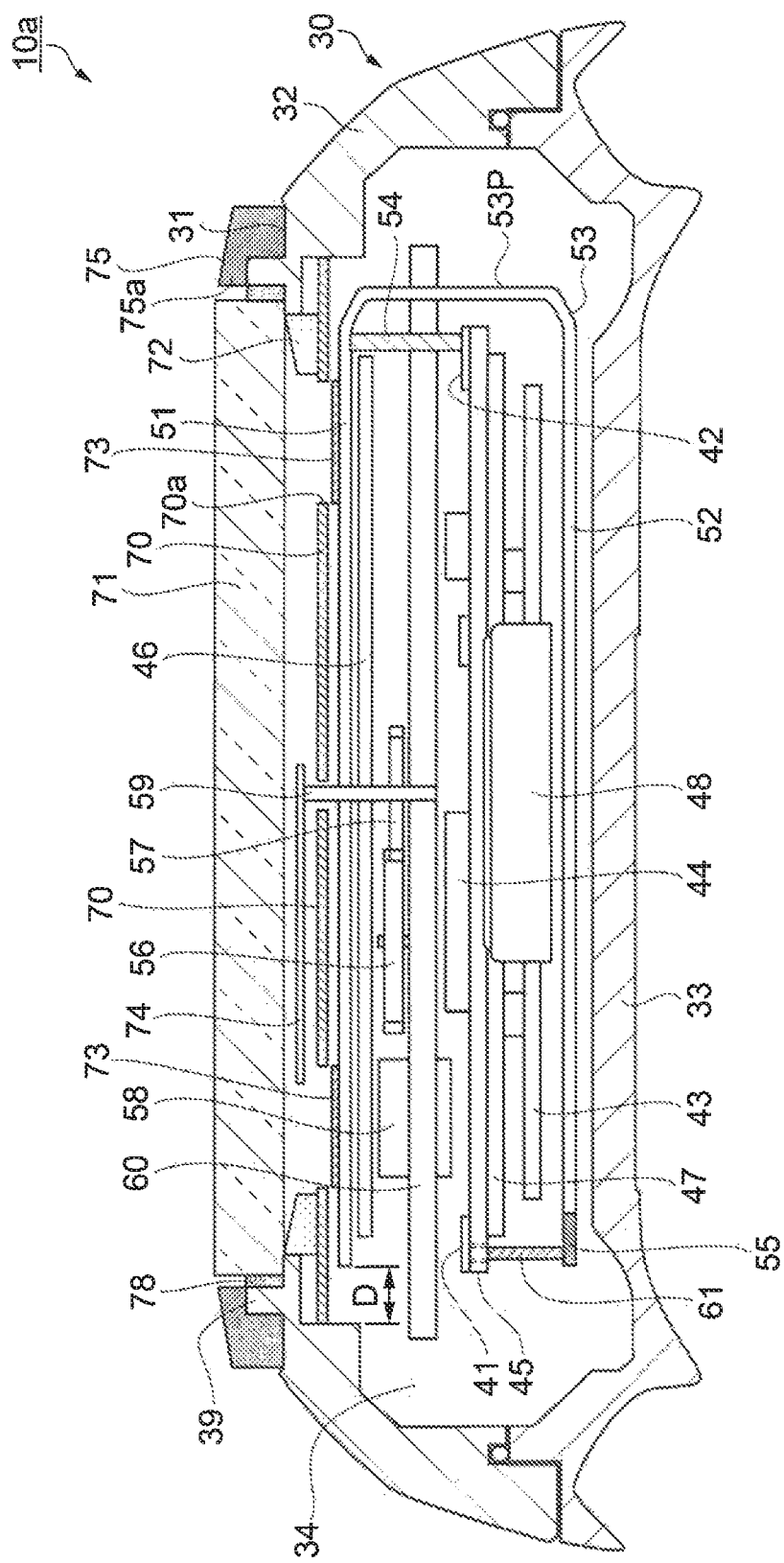
FIG. 11 is a cross-sectional view showing the internal configuration of the electronic timepiece according to a fifth embodiment.

Next, the configuration of the electronic timepiece according to a fifth embodiment of the portable electronic device according to the invention will be described with reference to FIG. 11. FIG. 11 is a cross-sectional view showing the internal configuration of the electronic timepiece according to the fifth embodiment. A device body 10a of the electronic timepiece according to the fifth embodiment shown in FIG. 11 differs from the device body 10 of the first embodiment described above in the configuration of the dial plate 70. In the following description, the arrangement configuration different from the above-described first embodiment will be mainly described, and similar forms and configurations are denoted by the same reference numerals and description thereof will be omitted.

As shown in FIG. 11, the device body 10a according to the fifth embodiment is provided with, as an internal structure, a power transmission mechanism including a step motor (motor) 58 which is a drive element for driving the indication needles 74 (including an hour hand, a minute hand, a second hand, or the like), and intermediate wheels (gears) 56 and 57 that transmit the rotation of the step motor 58 to a shaft 59. Further, the device body 10a includes a dial plate 70, a parting plate 72 provided between the dial plate 70 and the glass plate 71, and an internal structure accommodated in an internal space 34 that is configured with the dial plate 70, the top case 32 and the bottom case 33. The internal structure includes a planar inverted-F antenna including a first conductor element 51, a second conductor element 52, and a short circuit portion 53 short-circuiting the first conductor element 51 and the second conductor element 52, a circuit substrate 45, a circuit substrate presser 43, a base plate 60, a first anti-magnetic plate 46, a second anti-magnetic plate 47, and a battery 48. Since the configurations of planar inverted-F antenna including the first conductor element 51 and the second conductor element 52, the circuit substrate 45, the circuit substrate presser 43, the first anti-magnetic plate 46, the second anti-magnetic plate 47, the base plate 60, and the battery 48, as the internal structure, are similar to the first embodiment, and the explanation below will be omitted.

In the device body 10a according to the fifth embodiment, a solar panel 73 having a power generation function by sunlight or the like is disposed between the dial plate 70 and the first conductor element 51 so as to overlap the first conductor element 51. Therefore, in order to irradiate the solar panel 73 with the sunlight transmitted through the glass plate 71, a through hole 70a through which sunlight passes is provided at a position facing the solar panel 73 of the dial plate 70. It should be noted that the dial plate 70 can be made of a so-called light transmitting material that transmits sunlight, and if the dial plate 70 having such a configuration is used, there is no need to provide the through hole 70a necessarily. In addition, at least a part of the first conductor element 51 is preferably located outside the outer edge of the solar panel 73 in plan view as viewed from the glass plate 71 side. In other words, it is preferable that the size of the first conductor element 51 is equal to or larger than the size of the solar panel 73.

According to the device body 10a related to the fifth embodiment, on the side opposite to the second conductor element 52 side of the first conductor element 51, a dial plate 70 disposed so as to overlap the first conductor element 51, and a solar panel 73 which is disposed between the dial plate 70 and first conductor element 51 and receives light incident from the side of the dial plate 70 to generate power can be configured with high efficiency.

Further, by setting the size of the first conductor element 51 to be equal to or larger than the size of the solar panel 73, radio waves can be received without being affected by the solar panel 73. In addition, a metal or metal-coated supporting substrate (not shown) may be provided as a supporting portion for supporting the solar panel 73, and the supporting substrate may also be shared as the first conductor element 51. In this case, the antenna can be miniaturized as compared with the case where the supporting substrate is not shared.

Figure 12:
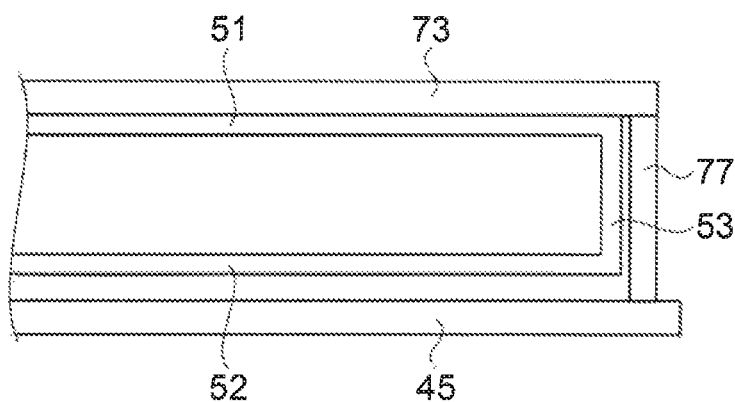
FIG. 12 is a partial sectional view for explaining the conduction portion between the solar panel and the circuit substrate.

Further, as shown in the partial sectional view of FIG. 12 for explaining the conduction portion between the solar panel 73 and the circuit substrate 45, it is preferable that the power generated by the solar panel 73 is input to the circuit substrate 45 by the conduction portion 77 disposed along the short circuit portion 53. The metal portion (a transparent electrode or a metal electrode) included in the solar panel 73 may affect the characteristics of the antenna, but by disposing the conduction portion 77 along the short circuit portion 53 in this manner, it is possible to reduce the influence on the antenna (the first conductor element 51 and the second conductor element 52) of the solar panel 73.

It is preferable that the conduction portion 77 includes a coil (not shown) having one end connected to the solar panel 73 and the other end connected to the circuit substrate 45. In this way, high frequency components in the solar panel 73 can be cut off and the influence of the solar panel 73 on the antenna (the first conductor element 51 and the second conductor element 52) can be reduced, by the coil (not shown) having one end connected to the solar panel 73, and the other end connected to the circuit substrate 45.

Sixth Embodiment

Figure 13:
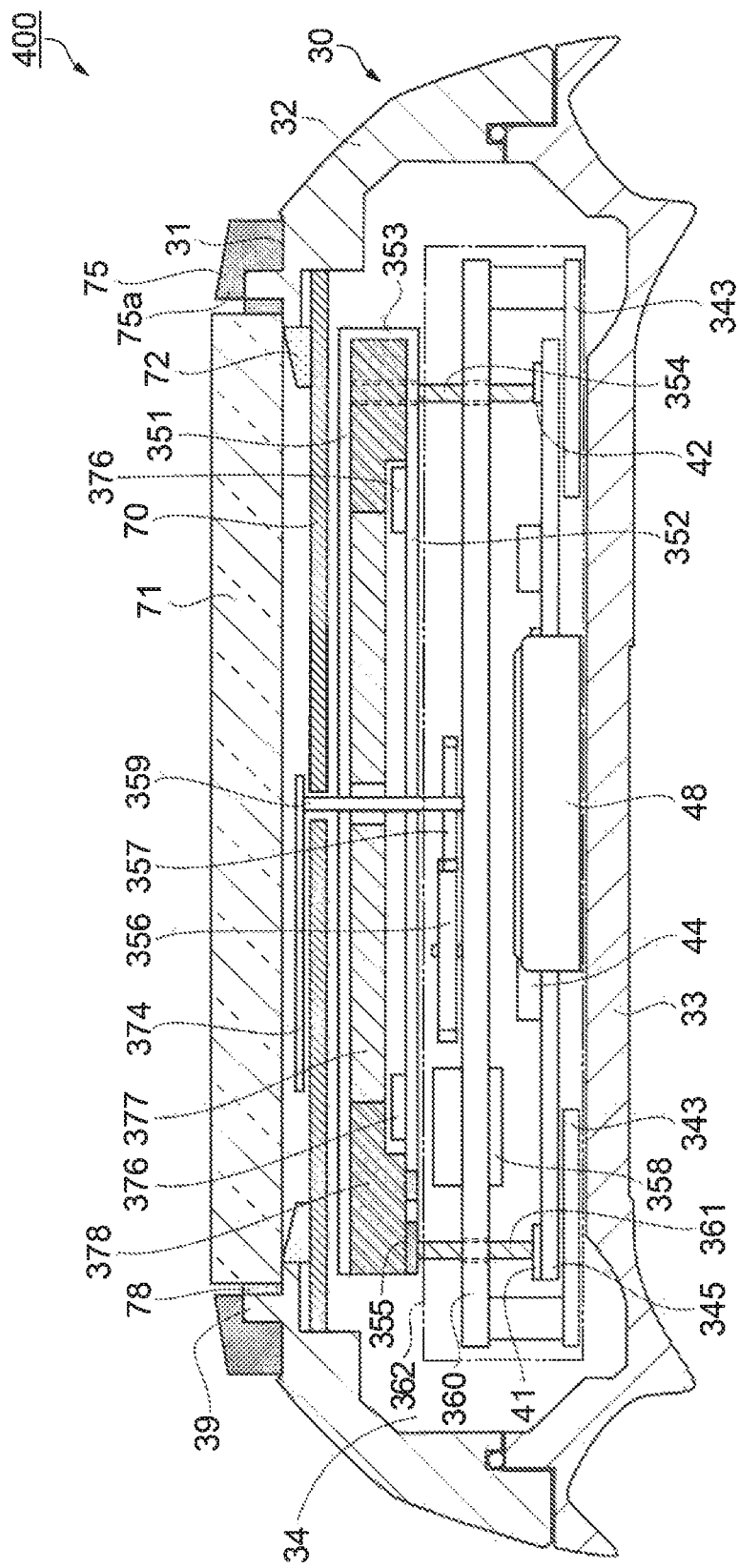
FIG. 13 is a cross-sectional view showing the internal configuration of the electronic timepiece according to a sixth embodiment.

Next, the configuration of the electronic timepiece according to a sixth embodiment of the portable electronic device according to the invention will be described with reference to FIG. 13. FIG. 13 is a cross-sectional view showing the internal configuration of the electronic timepiece according to the sixth embodiment. A device body 400 of the electronic timepiece according to the sixth embodiment shown in FIG. 13 differs from the device body 300 of the fourth embodiment described above in the arrangement position of the constituent elements. In the following description, a configuration different from the above-described fourth embodiment will be mainly described, and similar forms and configurations are denoted by the same reference numerals and description thereof will be omitted.

As shown in FIG. 13, a device body 400 according to the sixth embodiment is provided with, as an internal structure, a power transmission mechanism including a step motor (motor) 358 which is a drive element for driving the indication needles 374 (including an hour hand, a minute hand, a second hand, or the like), and intermediate wheels (gears) 356 and 357 that transmit the rotation of the step motor 358 to a shaft 359. Further, the device body 300 includes a dial plate 70, a parting plate 72 provided between the dial plate 70 and the glass plate 71, and an internal structure accommodated in an internal space 34 that is configured with the dial plate 70, the top case 32 and the bottom case 33. The internal structure includes a planar inverted-F antenna connected to the feed element 354, a circuit substrate 345, a circuit substrate presser 343, a base plate 360, a date wheel 376 disposed on the front surface of the second conductor element 352, a date wheel presser 377, a non-conductive spacer 378 disposed between the first conductor element 351 and the second conductor element 352, and a battery 48. Since the configurations of planar inverted-F antenna including the first conductor element 351 and the second conductor element 352, the circuit substrate 345, the circuit substrate presser 343, the base plate 360, and the battery 48, as the internal structure, are similar to the fourth embodiment, and the explanation below will be omitted. A configuration is possible in which the first anti-magnetic plate and the second anti-magnetic plate (not shown) are disposed.

In the device body 400, a first conductor element 351 and a second conductor element 352 facing the first conductor element 351 are disposed between the dial plate 70 and the base plate 360. A date wheel 376, a date wheel presser 377, and a spacer 378 made of a non-conductive material are disposed between the first conductor element 351 and the second conductor element 352. The date wheel presser 377 is located closer to the center side of the first conductor element 351 side than the date wheel 376 and retains the date wheel 376 slidably from the surface. Further, a through hole is provided in the central portion of the date wheel presser 377, and the shaft 359 is inserted.

The spacer 378 is disposed on the outer circumference side of the date wheel presser 377 between the first conductor element 351 and the second conductor element 352, and a step is provided at a position facing the date wheel 376. In the spacer 378, a side facing the first conductor element 351 and a side facing the second conductor element 352 are substantially parallel. With such a spacer 378, the parallelism between the first conductor element 351 and the second conductor element 352 can be maintained. In addition, the spacer 378 is made of a non-conductive material.

Further, it is preferable that the spacer 378 is made of a resin with a smaller dissipation factor value than the date wheel presser 377. By making the dissipation factor of the spacer 378 smaller than that of the date wheel presser 377 in this manner, the loss of the planar inverted-F antenna due to the dissipation factor of the spacer 378 can be reduced. Generally, since power loss increases when the dissipation factor is large, it is disadvantageous for the planar inverted-F antenna, but by using a resin with a smaller dissipation factor (for example, about $1 \times 10^{-4}$) than the date wheel presser 377 as the material of the spacer 378, it is possible to reduce the loss of the planar inverted-F antenna.

Note that as the materials of the date wheel 376, the date wheel presser 377, and the spacer 378, which are made of a non-conductive material, for example, thermoplastic resins such as acrylic (PMMA), polycarbonate (PC), polypropylene (PP), polyvinyl chloride (PVC), and acrylonitrile-butadiene-styrene copolymer (ABS resin), or thermosetting resins such as phenol resin (PF), epoxy resin (EP), melamine resin (MF), polyurethane resin (PUR), and silicone resin (SI) can be exemplified.

On the side opposite to the side of the first conductor element 351 of the second conductor element 352, a base plate 360 disposed to overlap the second conductor element 352, a power transmission mechanism including a step motor 358 which is a driving element connected to the base plate 360, intermediate wheels (gears) 356 and 357, and a shaft 359, and a movement 362 including a circuit substrate 345, a circuit substrate presser 343, or the like are disposed.

According to such a device body 400 of the sixth embodiment, the non-conductive date wheel 376, the date wheel presser 377, and the spacer 378 are regarded as dielectrics and a wavelength shortening effect due to the date wheel 376, the date wheel presser 377, and the spacer 378 is utilized, such that the planar inverted-F antenna configured to include the planar first conductor element 351, the planar second conductor element 352, and the short circuit portion 353 connecting the first conductor element 351 and the second conductor element 352 can be miniaturized. In addition, the first conductor element 351 and the second conductor element 352 can be supported substantially in parallel by the non-conductive spacer 378 disposed between the first conductor element 351 and the second conductor element 352. This makes it possible to prevent a reduction in the sensitivity of the antenna and the variation of the resonance frequency due to the fact that the parallelism between the first conductor element 351 and the second conductor element 352 cannot be maintained.

Seventh Embodiment

Figure 14:
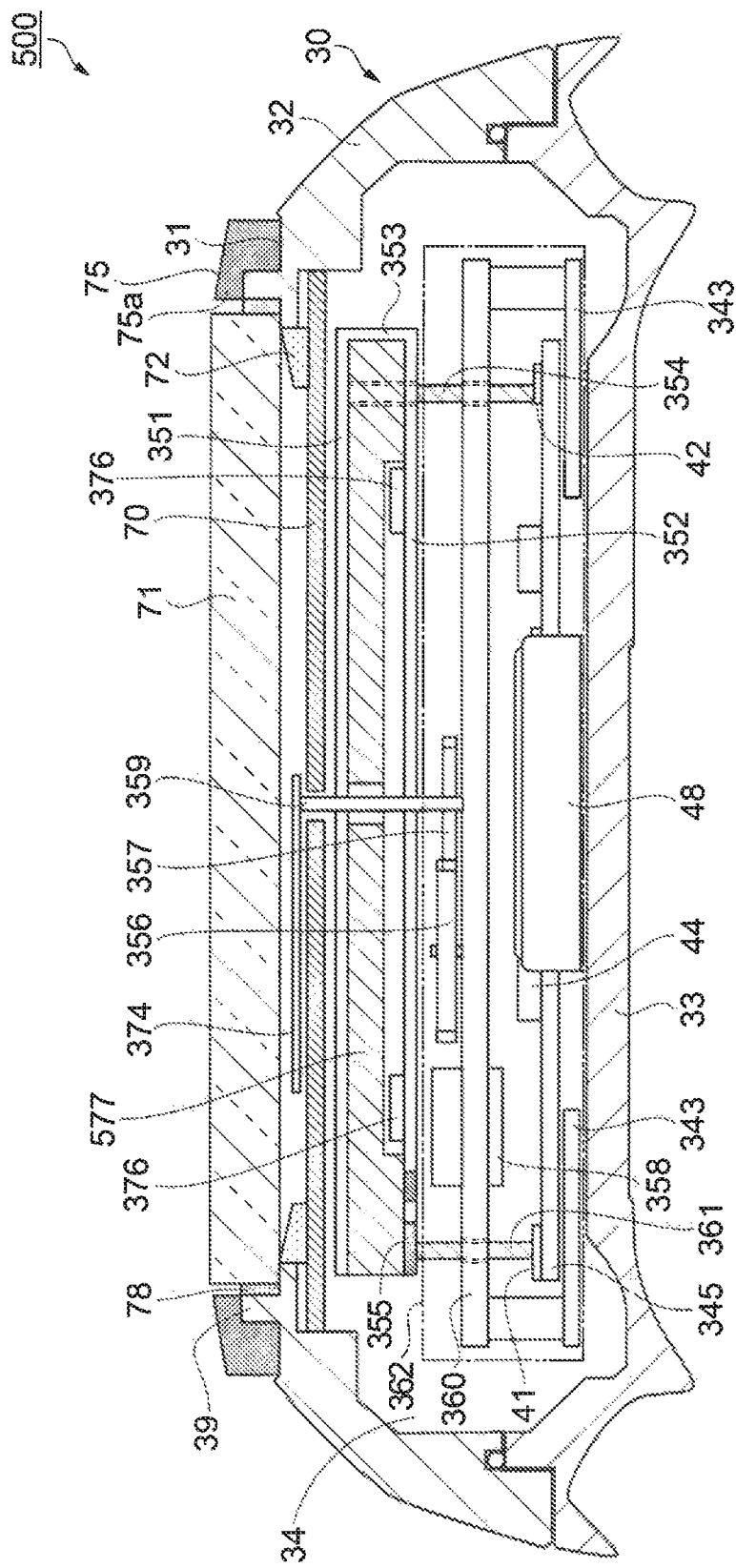
FIG. 14 is a cross-sectional view showing the internal configuration of the electronic timepiece according to a seventh embodiment.

Next, the configuration of the electronic timepiece according to a seventh embodiment of the portable electronic device according to the invention will be described with reference to FIG. 14. FIG. 14 is a cross-sectional view showing the internal configuration of the electronic timepiece according to the seventh embodiment. The device body 500 of the electronic timepiece according to the seventh embodiment shown in FIG. 14 is different from the device body 400 of the sixth embodiment described above in the configurations of the date wheel presser 377 and the spacer 378. In the following description, the date wheel presser 377 and the spacer 378 which are different from the above-described sixth embodiment will be mainly described, and similar forms and configurations are denoted by the same reference numerals and description thereof will be omitted.

In the device body 500 according to the seventh embodiment, a dial plate 70, a parting plate 72 provided between the dial plate 70 and the glass plate 71, and an internal structure accommodated in an internal space 34 configured with the dial plate 70, the top case 32 and the bottom case 33 are the same as the device body 400 according to the sixth embodiment described above, except for the configurations of the date wheel presser 377 and the spacer 378, so that an explanation thereof will be omitted. A configuration is possible in which the first anti-magnetic plate and the second anti-magnetic plate (not shown) are disposed.

As shown in FIG. 14, with respect to the spacer 577 constituting the internal structure of the seventh embodiment, the date wheel presser 377 and the spacer 378 of the sixth embodiment shown in FIG. 13 are integrally formed with a non-conductive resin having a small dissipation factor (for example, about $1\times10^{-4}$). The spacer 577 is located between the first conductor element 351 and the second conductor element 352, is located closer to the center side of the date wheel 376, and includes a portion that retains the date wheel 376 so as to be slidable from the front surface side and a portion that retains the outer peripheral portions of the first conductor element 351 and the second conductor element 352 substantially in parallel. In the spacer 577, a step portion is provided at a position facing the date wheel 376. Further, a through hole is provided in the central portion of the spacer 577, and the shaft 359 is inserted.

According to the application example, by the spacer 577 formed by integrating the spacer and the date wheel presser with a resin having a small dissipation factor (for example, about $1\times10^{-4}$), the planar inverted-F antenna can be miniaturized. In addition, since the dissipation factor of the spacer 577 is small, it is possible to reduce the power loss due to the large dissipation factor, to reduce the loss of the antenna, and to reduce the number of parts by forming the spacer and the date wheel presser as a single component.

Eighth Embodiment

Figure 15:
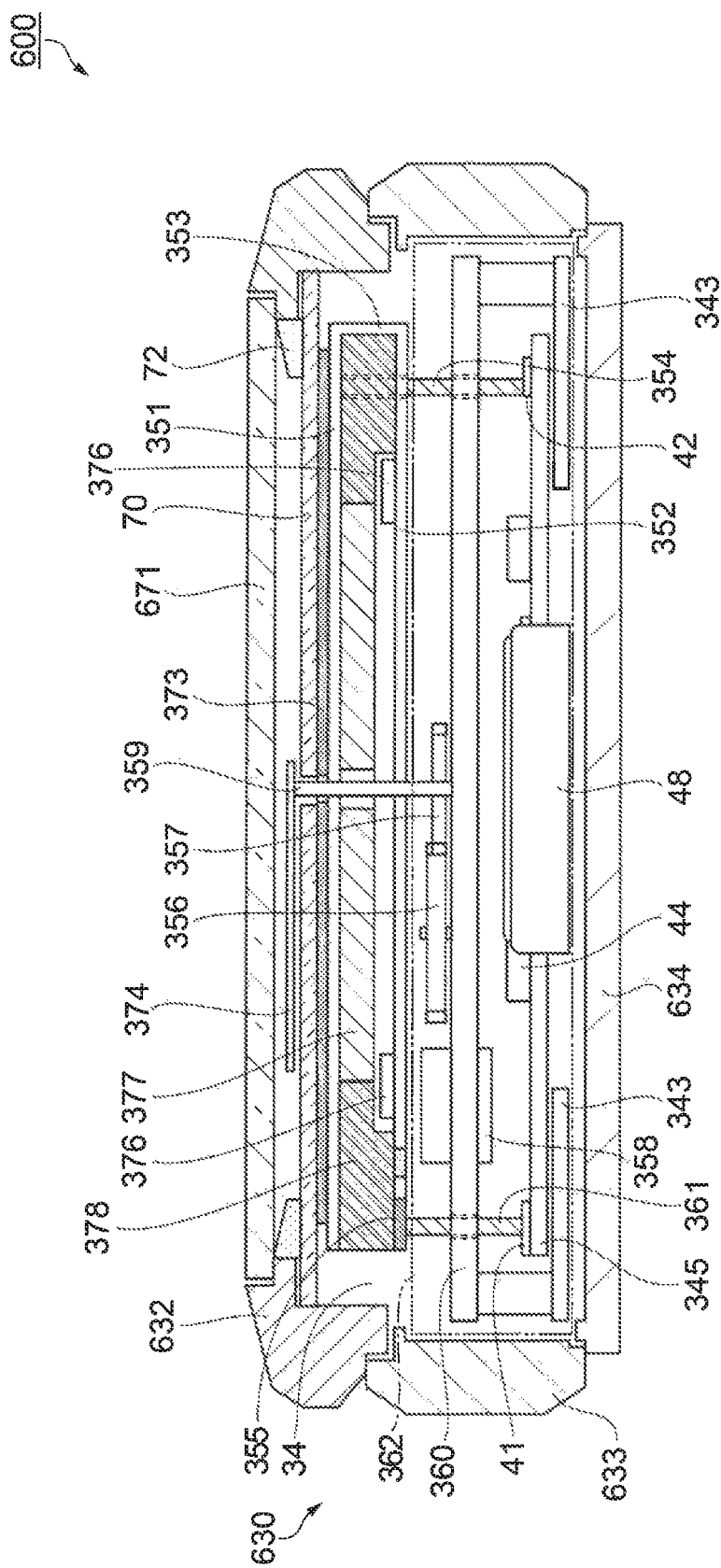
FIG. 15 is a cross-sectional view showing the internal configuration of the electronic timepiece according to an eighth embodiment.

Next, the configuration of the electronic timepiece according to an eighth embodiment of the portable electronic device according to the invention will be described with reference to FIG. 15. FIG. 15 is a cross-sectional view showing the internal configuration of the electronic timepiece according to the eighth embodiment. The device body 600 of the electronic timepiece according to the eighth embodiment shown in FIG. 15 differs from the device body 400 of the sixth embodiment described above in the configuration of the case 30, and includes a solar panel 373 which is additionally disposed. In the following description, a configuration different from the above-described sixth embodiment will be mainly described, and similar forms and configurations are denoted by the same reference numerals and description thereof will be omitted. A configuration is possible in which the first anti-magnetic plate and the second anti-magnetic plate (not shown) are disposed.

As shown in FIG. 15, the device body 600 according to the eighth embodiment includes a case 633, a bezel 632, a glass plate 671 having a light-transmitting property, and a back cover 634, which constitute an exterior case 630. For example, the exterior case 630 is formed by fitting the bezel 632 made of ceramic into the cylindrical case 633 made of metal such as stainless steel. A disk-shaped dial plate 70 having a light-transmitting property is disposed on the inner peripheral side of the bezel 632.

In the device body 600, the opening on the front surface side of the two openings of the case 633 is blocked with a glass plate 671 through a bezel 632, and the opening on the back surface side is blocked with a back cover 634 made of metal. A solar panel 373 is disposed directly below the dial plate 70 having a light-transmitting property, in other words, between the dial plate 70 and the first conductor element 351 of the planar inverted-F antenna constituting the internal structure. For example, the solar panel 373 can generate electricity by light such as sunlight, which is transmitted through the light-transmitting glass plate 671 and the dial plate 70 having a light-transmitting property. In the internal space 34 on the back cover 634 side of the solar panel 373, an internal structure similar to that of the above-described sixth embodiment is provided.

As shown in FIG. 15, a device body 600 according to the eighth embodiment is provided with, as an internal structure, a power transmission mechanism including a step motor (motor) 358 which is a drive element for driving the indication needles 374 (including an hour hand, a minute hand, a second hand, or the like), and intermediate wheels (gears) 356 and 357 that transmit the rotation of the step motor 358 to a shaft 359. Further, the device body 600 includes a dial plate 70, a parting plate 72 provided between the dial plate 70 and the glass plate 671, and an internal structure accommodated in an internal space 34 that is configured with the dial plate 70, and the exterior case 630. The internal structure includes a planar inverted-F antenna connected to the feed element 354, a circuit substrate 345, a circuit substrate presser 343, a base plate 360, a date wheel 376 disposed on the front surface of the second conductor element 352, a date wheel presser 377, a non-conductive spacer 378 disposed between the first conductor element 351 and the second conductor element 352, and a battery 48. Since the configuration of the internal structure including the planar inverted-F antenna including the first conductor element 351 and the second conductor element 352, the circuit substrate 345, the circuit substrate presser 343, the base plate 360, and the battery 48 is similar to that in the sixth embodiment, and the explanation thereof will be omitted.

On the side opposite to the side of the first conductor element 351 of the second conductor element 352, a base plate 360 disposed to overlap the second conductor element 352, a power transmission mechanism including a step motor 358 which is a driving element connected to the base plate 360, intermediate wheels (gears) 356 and 357, and a shaft 359, and a movement 362 including a circuit substrate 345, a circuit substrate presser 343, or the like are disposed.

According to such a device body 600 of the eighth embodiment, the non-conductive date wheel 376, the date wheel presser 377, and the spacer 378, which are disposed inside the exterior case 630 including the case 633, the bezel 632, the glass plate 671, and the back cover 634, are regarded as dielectrics, and a wavelength shortening effect due to the date wheel 376, the date wheel presser 377, and the spacer 378 is utilized, such that the planar inverted-F antenna configured to include the planar first conductor element 351, the planar second conductor element 352, and the short circuit portion 353 connecting the first conductor element 351 and the second conductor element 352 can be miniaturized. In addition, the first conductor element 351 and the second conductor element 352 can be supported substantially in parallel by the non-conductive spacer 378 disposed between the first conductor element 351 and the second conductor element 352. This makes it possible to prevent a reduction in the sensitivity of the antenna and the variation of the resonance frequency due to the fact that the parallelism between the first conductor element 351 and the second conductor element 352 cannot be maintained.

The device bodies 10, 10a, 100, 200, 300, 400, 500, and 600 of respective embodiments described above can be configured such that the first anti-magnetic plates 46, 146, and 246 are shared as the first conductor elements 51, 151, and 251. Similarly, it is possible to configure that the second anti-magnetic plates 47, 147, and 247 are shared as the second conductor elements 52, 152, and 252. With such a configuration, a thinner internal structure can be obtained. In addition, the second anti-magnetic plates 47, 147, and 247 may be disposed between the base plates 60, 160, 260, and 360 and the circuit substrates 45, 145, 245, and 345.

In each of the above-described embodiments, the display unit 5 is described as an analog display type using the dial plate 70, the indication needle 74, or the like, but the invention is not limited to this. For example, the configuration of the internal structure including the same planar inverted-F antenna as in each embodiment described above can also be applied to a configuration of a digital display type using for example, a liquid crystal display (LCD) or the like, as the display unit 5.

In the above description, the GPS using the GPS satellite 8 as the position information satellite included in the global navigation satellite system (GNSS) has been described as an example, but this is only an example. The global navigation satellite system may include other systems such as Galileo (EU), GLONASS (Russia), and Hokuto (China), stationary satellites such as SBAS, and a position information satellite that transmits satellite signals, such as a quasi-zenith satellite. That is, the electronic timepiece W may be configured to acquire any one of date information, time information, position information and speed information which are obtained by processing radio waves (radio signals) from a position information satellite including a satellite other than the GPS satellite 8. In addition, the global navigation satellite system can be a regional navigation satellite system (RNSS). In this case, the antenna structure described above can be an antenna corresponding to various regional navigation satellite systems (RNSS).

What is claimed is:

1. A portable electronic device comprising:
a planar first conductor element connected to a feed portion;
a planar second conductor element which is disposed so as to overlap the first conductor element in plan view and includes a ground portion;
a short circuit portion that connects the first conductor element and the second conductor element; and
a non-conductive base plate that is disposed between the first conductor element and the second conductor element and to which a driving element is attached.

2. The portable electronic device according to claim 1, wherein the base plate and a circuit substrate including at least a circuit that controls the driving element are disposed between the first conductor element and the second conductor element.

3. The portable electronic device according to claim 2, further comprising:
a first anti-magnetic plate; and
a second anti-magnetic plate,
wherein the base plate and the circuit substrate are disposed between the first anti-magnetic plate and the second anti-magnetic plate.

4. The portable electronic device according to claim 3, wherein the first anti-magnetic plate, the base plate, the circuit substrate, and the second anti-magnetic plate are disposed between the first conductor element and the second conductor element.

5. The portable electronic device according to claim 2, wherein the second conductor element is disposed between the base plate and the circuit substrate.

6. The portable electronic device according to claim 5, further comprising:
a first anti-magnetic plate; and
a second anti-magnetic plate,
wherein the first conductor element, the base plate, the second conductor element, and the circuit substrate are disposed between the first anti-magnetic plate and the second anti-magnetic plate.

7. The portable electronic device according to claim 2, wherein the first conductor element is a first anti-magnetic plate.

8. The portable electronic device according to claim 7, wherein the second conductor element is a second anti-magnetic plate.

9. The portable electronic device according to claim 8, wherein the base plate and the circuit substrate are disposed between the first anti-magnetic plate and the second conductor element.

10. The portable electronic device according to claim 8, wherein the second anti-magnetic plate is disposed between the base plate and the circuit substrate.

11. The portable electronic device according to claim 1, further comprising:
a solar panel supported by a supporting portion,
wherein the supporting portion also serves as the first conductor element.

12. The portable electronic device according to claim 1, wherein a through hole is formed in the first conductor element, and
wherein a rotation shaft is disposed in the through hole.

13. A portable electronic device comprising:
a planar first conductor element connected to a feed portion;
a planar second conductor element which is disposed so as to overlap the first conductor element in plan view and includes a ground portion;
a short circuit portion that connects the first conductor element and the second conductor element;
a non-conductive date wheel and a non-conductive date wheel presser that are disposed between the first conductor element and the second conductor element; and
a movement that is disposed on a first side of the second conductor element opposite to a second side of the second conductor element that faces the first conductor element so as to overlap the second conductor element.

14. The portable electronic device according to claim 13, further comprising:
a circuit substrate,
wherein the movement is disposed between the second conductor element and the circuit substrate.

15. The portable electronic device according to claim 13, wherein the feed portion of the first conductor element is connected to a feed terminal of the circuit substrate, and
wherein the ground portion of the second conductor element is connected to a ground terminal of the circuit substrate.

16. The portable electronic device according to claim 13, wherein the first conductor element, the second conductor element, and the short circuit portion are integrally formed as a one-piece unitary structure.

17. The portable electronic device according to claim 13, wherein the short circuit portion includes a curved portion.

18. The portable electronic device according to claim 13, wherein the short circuit portion includes a plurality of connection portions.

19. The portable electronic device according to claim 13, wherein the short circuit portion includes a plurality of the short circuit portions, and
wherein an angle θ between a first imaginary line connecting a first short circuit portion of the plurality of short circuit portions located at one end and a center of the first conductor element, and a second imaginary line connecting a second short circuit portion of the plurality of short circuit portions located at the other end and the center of the first conductor element satisfies 0 degrees<θ≤90 degrees.

20. The portable electronic device according to claim 13, wherein the short circuit portion includes a plurality of the short circuit portions, and
wherein an angle θ between a first imaginary line connecting a first short circuit portion of the plurality of short circuit portions located at one end and a center of the first conductor element, and a second imaginary line connecting a second short circuit portion of the plurality of short circuit portions located at the other end and the center of the first conductor element satisfies 0 degrees<θ≤170 degrees.

21. The portable electronic device according to claim 13, further comprising:
a dial plate that is disposed on a side opposite to a side of the second conductor element of the first conductor element so as to overlap the first conductor element; and
a solar panel that is disposed between the dial plate and the first conductor element and receives light incident from the side of the dial plate to generate power.

22. The portable electronic device according to claim 21, wherein at least a part of the first conductor element is located outside the outer edge of the solar panel in plan view.

23. The portable electronic device according to claim 21, wherein the power generated by the solar panel is input to the circuit substrate by a conduction portion disposed along the short circuit portion.

24. The portable electronic device according to claim 23, wherein the conduction portion includes a coil.

25. The portable electronic device according to claim 24, wherein the coil has one end connected to the solar panel, and the other end connected to the circuit substrate.

26. The portable electronic device according to claim 13, further comprising:
a case made of metal,
wherein a distance between the outer edge of the first conductor element accommodated inside the case and the inner wall of the case is 1 mm or more in plan view.

27. The portable electronic device according to claim 13, further comprising:
a non-conductive spacer that is disposed between the first conductor element and the second conductor element,
wherein the spacer is configured such that a side facing the first conductor element and a side facing the second conductor element are substantially parallel.

28. The portable electronic device according to claim 27, wherein the spacer is made using a resin with a smaller dissipation factor value than the date wheel presser.

29. The portable electronic device according to claim 27, wherein the spacer and the date wheel presser are integrally formed as a one-piece unity structure with the resin.

30. A portable electronic device comprising:
a planar first conductor element connected to a feed portion;
a planar second conductor element which is disposed so as to overlap the first conductor element in plan view and includes a ground portion;
a short circuit portion that connects the first conductor element and the second conductor element;
a non-conductive date wheel and a non-conductive date wheel presser that are disposed between the first conductor element and the second conductor element;
a movement that is disposed on a first side of the second conductor element opposite to a second side of the first conductor element of the second conductor element that faces the first conductor element so as to overlap the second conductor element; and
a non-conductive base plate that is disposed so as to overlap the first conductor element in plan view and to which a driving element is attached.

* * * * *